(12) United States Patent
Oguro et al.

(10) Patent No.: US 8,270,306 B2
(45) Date of Patent: Sep. 18, 2012

(54) FAULT MANAGEMENT APPARATUS AND METHOD FOR IDENTIFYING CAUSE OF FAULT IN COMMUNICATION NETWORK

(75) Inventors: Keiichi Oguro, Kawasaki (JP); Yukihiro Watanabe, Kawasaki (JP); Kuniaki Shimada, Kawasaki (JP); Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 962 days.

(21) Appl. No.: 11/270,833

(22) Filed: Nov. 10, 2005

(65) Prior Publication Data

US 2007/0014233 A1 Jan. 18, 2007

(30) Foreign Application Priority Data

Feb. 10, 2005 (JP) ................................. 2005-035170

(51) Int. Cl.
*G01R 31/08* (2006.01)
*G06F 15/173* (2006.01)
(52) U.S. Cl. .................... 370/242; 370/250; 709/224
(58) Field of Classification Search .................. 370/216, 370/217, 220, 221, 241.1, 244, 245–252, 370/242; 709/224, 226
See application file for complete search history.

(56) References Cited

U.S. PATENT DOCUMENTS

| | | | | |
|---|---|---|---|---|
| 7,054,265 | B1 * | 5/2006 | Sugawara et al. ............. | 370/225 |
| 7,392,301 | B1 * | 6/2008 | Perry et al. .................... | 709/221 |
| 2004/0160895 | A1 * | 8/2004 | Holmgren et al. ............ | 370/223 |
| 2004/0170128 | A1 * | 9/2004 | Takamichi ..................... | 370/245 |
| 2004/0199627 | A1 * | 10/2004 | Frietsch ......................... | 709/224 |
| 2005/0099955 | A1 * | 5/2005 | Mohan et al. ................. | 370/242 |
| 2005/0249119 | A1 * | 11/2005 | Elie-Dit-Cosaque et al. | 370/236 |
| 2007/0014233 | A1 * | 1/2007 | Oguro et al. .................. | 370/216 |
| 2007/0076720 | A1 * | 4/2007 | Wu ................................ | 370/392 |

FOREIGN PATENT DOCUMENTS

| | | |
|---|---|---|
| JP | 5-260132 | 10/1993 |
| JP | 09-284281 | 10/1997 |
| JP | 2002-354038 | 12/2002 |
| JP | 2003-273928 | 9/2003 |
| JP | 2004-222105 | 8/2004 |
| WO | 2006/046309 A1 | 5/2006 |

OTHER PUBLICATIONS

Yukihiro Watanabe, "Discovering Multilayer Network Topology" IEICE Technical Reports DC2006-19, Jul. 25, 2006, pp. 37-42.
Japanese Office Action issued Jan. 12, 2010 in corresponding Japanese Patent Application 2005-035170.

* cited by examiner

*Primary Examiner* — Michael Thier
*Assistant Examiner* — Awet Haile
(74) *Attorney, Agent, or Firm* — Staas & Halsey LLP

(57) ABSTRACT

The communication availability information between a plurality of transmitters and a plurality of destinations before the communication state between a transmitter and a destinations in a communication network changes from available to unavailable is compared, layer by layer from an upper layer toward a lower layer, with the communication availability information after change, and destinations in paths where the communication state has changed from available to unavailable are grouped. Thus, the communication network is divided into a plurality of affected ranges and an interface of a device located at the border between the affected ranges is deduced as a fault occurrence point.

19 Claims, 50 Drawing Sheets

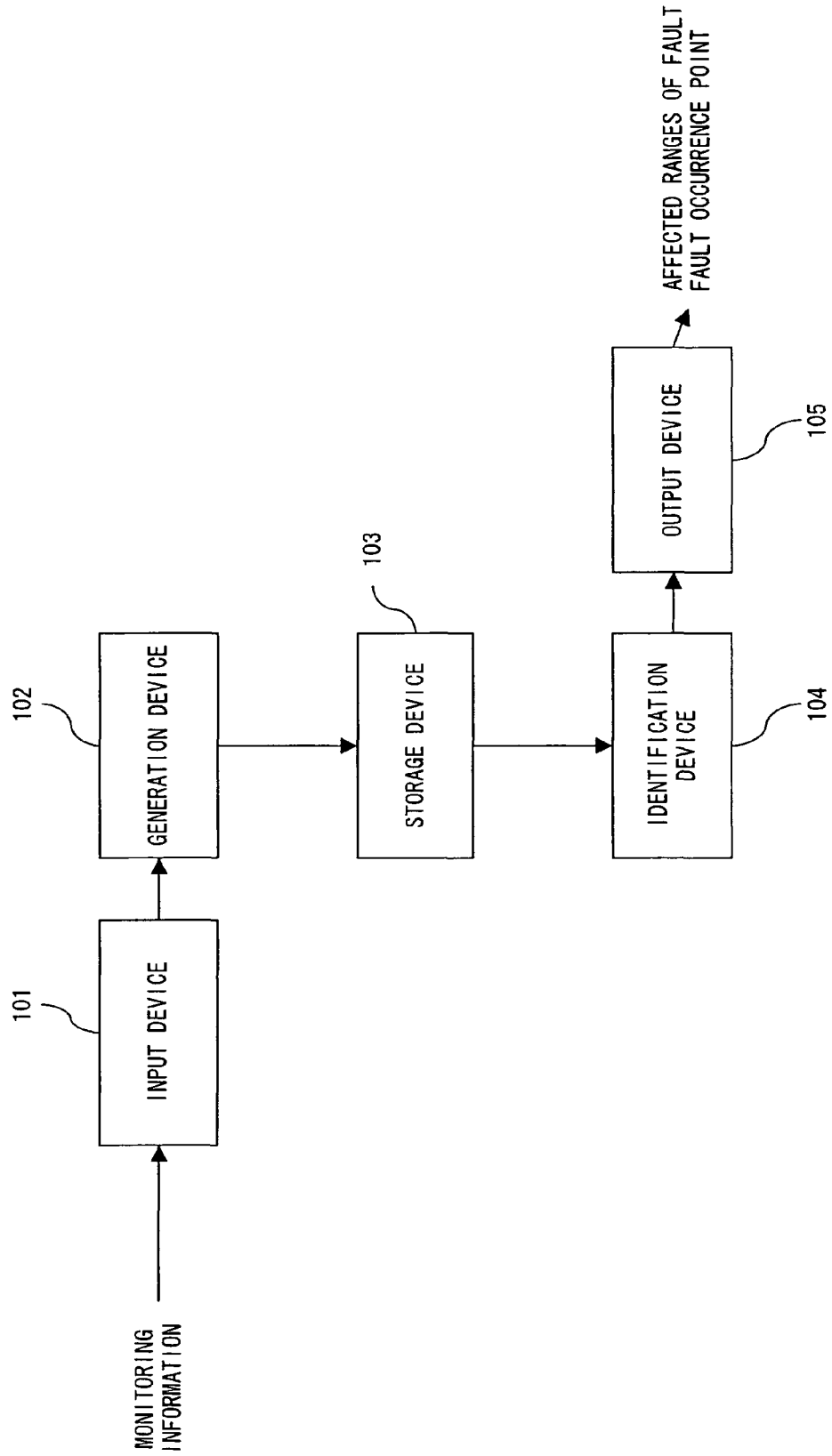
F I G. 1

| DESTINATION / TRANSMITTER | AT NORMAL | | | | AT FAULT OCCURRENCE | | | |
|---|---|---|---|---|---|---|---|---|
| | E | F | G | H | E | F | G | H |
| A | ○ | ○ | × | × | × | × | × | × |
| B | ○ | ○ | ○ | ○ | × | × | ○ | ○ |
| C | ○ | ○ | ○ | ○ | × | × | ○ | ○ |
| D | ○ | ○ | ○ | ○ | × | × | ○ | ○ |
| E | − | ○ | ○ | ○ | − | ○ | × | × |
| F | ○ | − | ○ | ○ | ○ | − | × | × |
| G | ○ | ○ | − | ○ | × | × | − | ○ |
| H | ○ | ○ | ○ | − | × | × | ○ | − |

FIG. 6

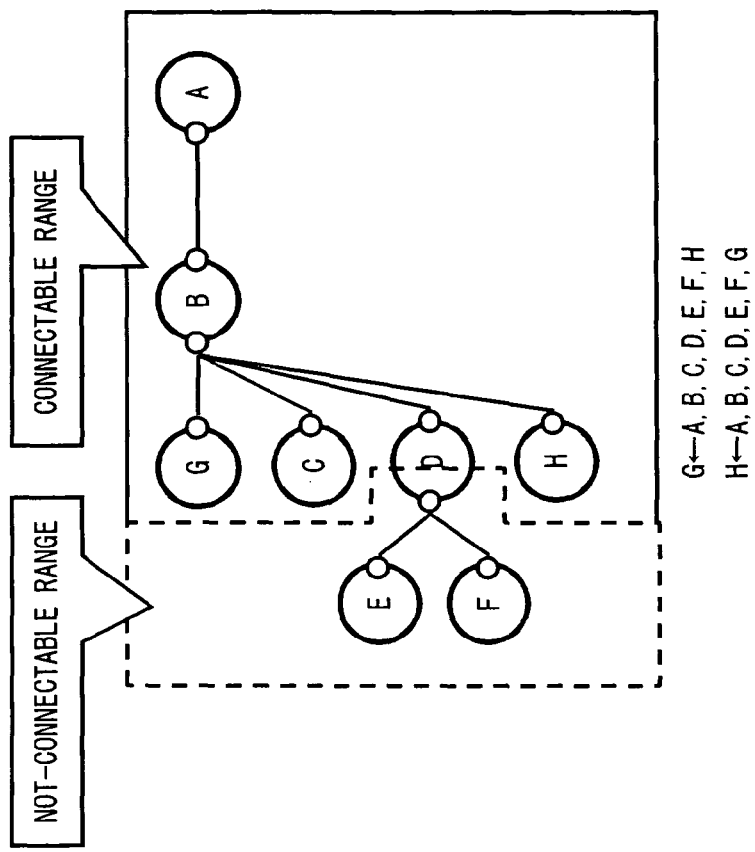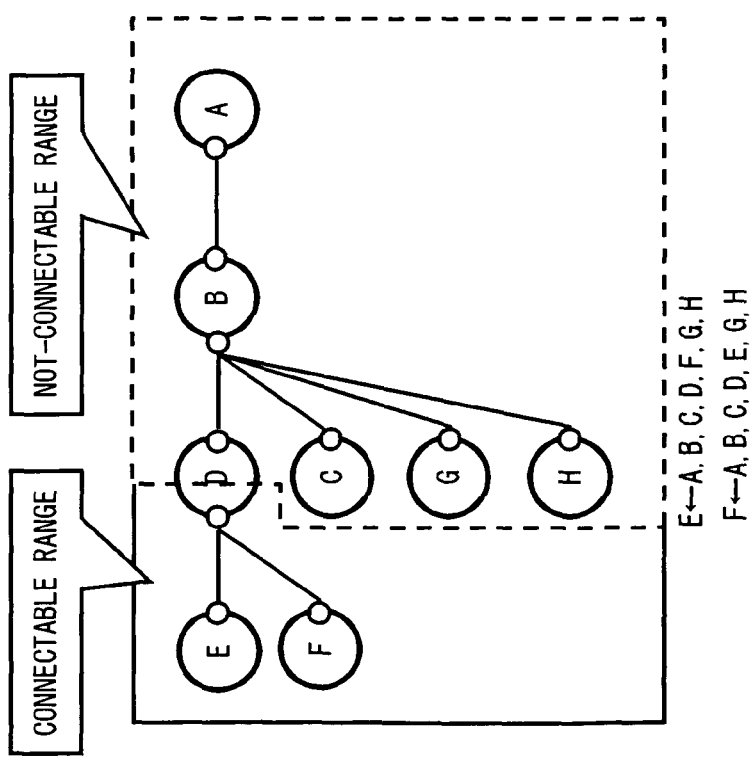
FIG. 8

| DESTINATION / TRANSMITTER | AT NORMAL | | | | | | AT FAULT OCCURRENCE | | | | | |
|---|---|---|---|---|---|---|---|---|---|---|---|---|
| | B | D | E | F | G | H | B | D | E | F | G | H |
| A | ○ | × | × | × | × | × | ○ | × | × | × | × | × |
| B | — | ○ | × | × | ○ | ○ | — | ○ | × | × | ○ | ○ |
| C | ○ | × | × | × | × | × | ○ | × | × | × | × | × |
| D | ○ | — | ○ | ○ | × | × | ○ | — | × | × | × | × |
| E | × | ○ | — | × | × | × | × | × | — | × | × | × |
| F | × | ○ | × | — | × | × | × | × | × | — | × | × |
| G | ○ | × | × | × | — | × | ○ | × | × | × | — | |
| H | ○ | × | × | × | × | — | ○ | × | × | × | × | — |

F I G. 1 1

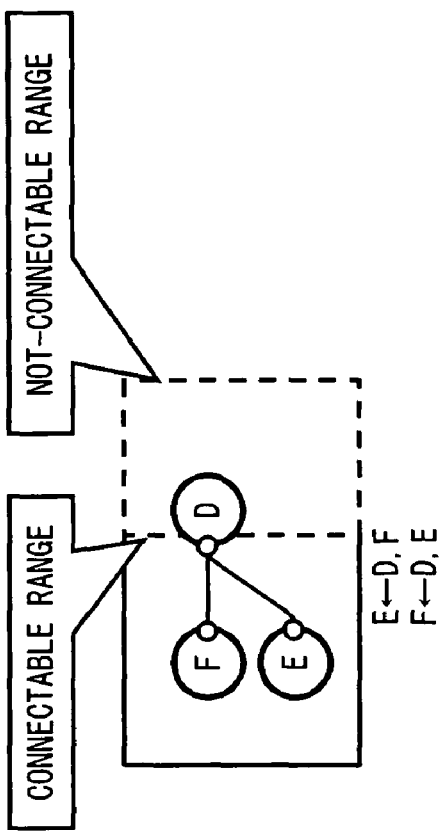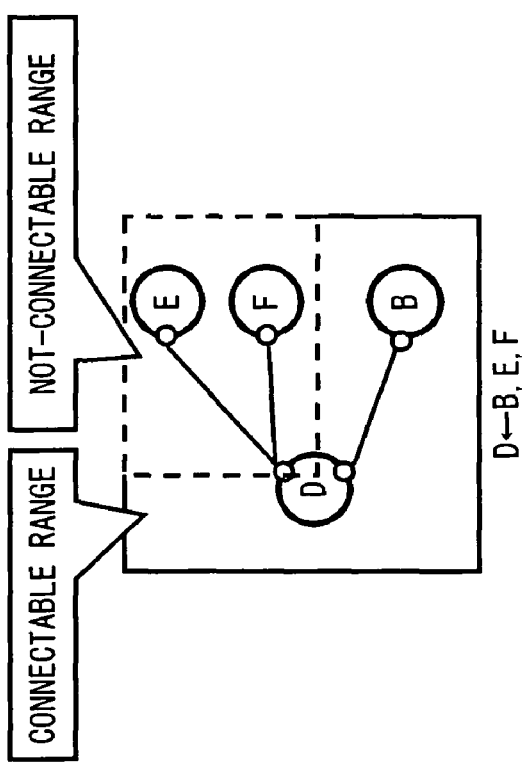
FIG. 13

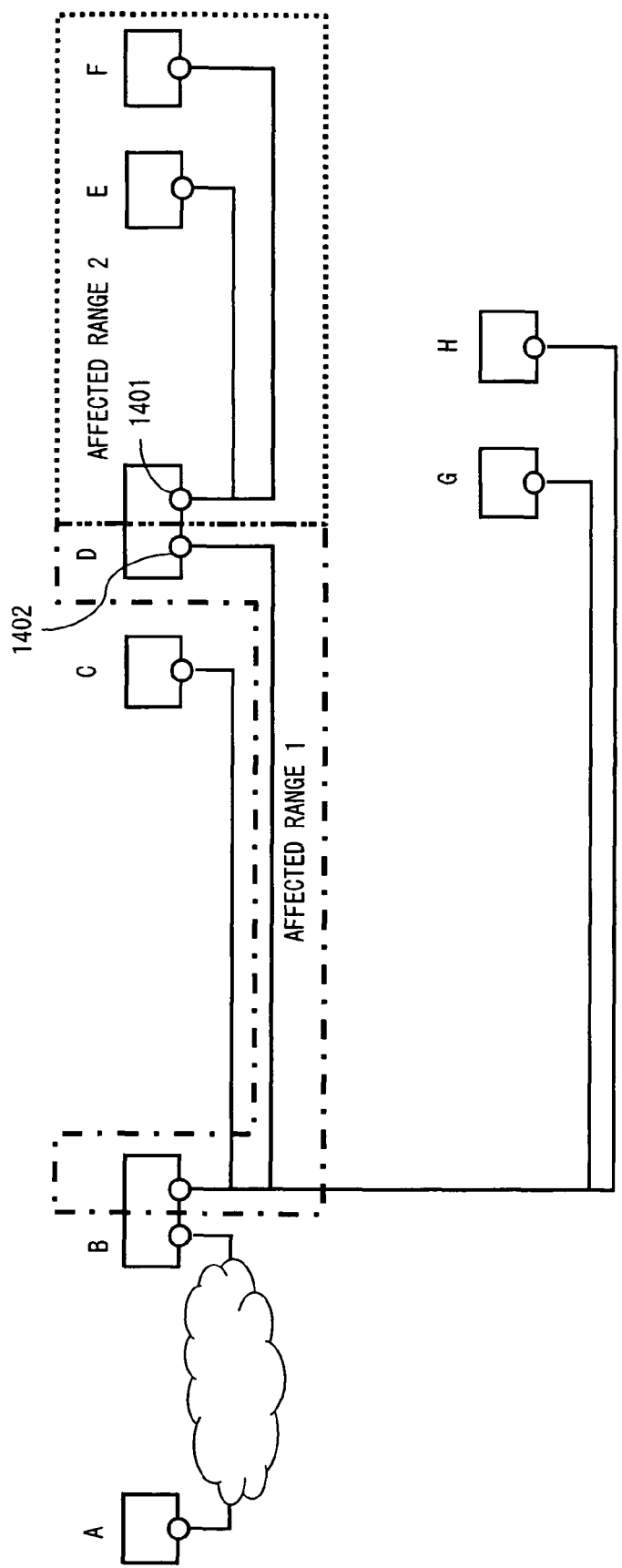
F I G. 14

FIG. 16

| TRANSMITTER \ DESTINATION | AT NORMAL | | | | | | | | | | AT FAULT OCCURRENCE | | | | | | | | | |
|---|---|---|---|---|---|---|---|---|---|---|---|---|---|---|---|---|---|---|---|---|
| | A | B | C | D | E | F | G | H | I | J | A | B | C | D | E | F | G | H | I | J |
| A | — | O | × | × | × | × | × | × | × | × | — | O | × | × | × | × | × | × | × | × |
| B | O | — | O | O | × | × | O | O | O | O | O | — | O | O | × | × | O | O | O | O |
| C | × | O | — | O | × | × | O | O | O | O | × | O | — | O | × | × | O | O | O | O |
| D | × | O | O | — | O | O | O | O | O | O | × | O | O | — | × | × | O | O | O | O |
| E | × | × | × | O | — | O | × | × | × | × | × | × | × | × | — | O | × | × | × | × |
| F | × | × | × | O | O | — | × | × | × | × | × | × | × | × | O | — | × | × | × | × |
| G | × | O | O | O | × | × | — | O | O | O | × | O | O | O | × | × | — | O | O | O |
| H | × | O | O | O | × | × | O | — | O | O | × | O | O | O | × | × | O | — | O | O |
| I | × | O | O | O | × | × | O | O | — | O | × | O | O | O | × | × | O | O | — | O |
| J | × | O | O | O | × | × | O | O | O | — | × | O | O | O | × | × | O | O | O | — |

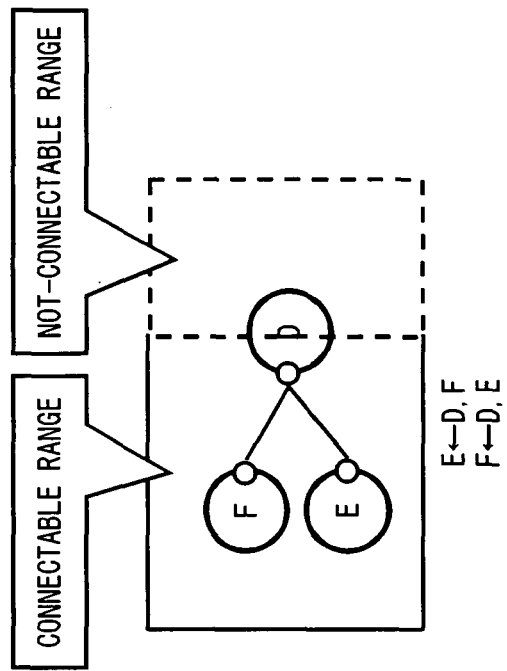
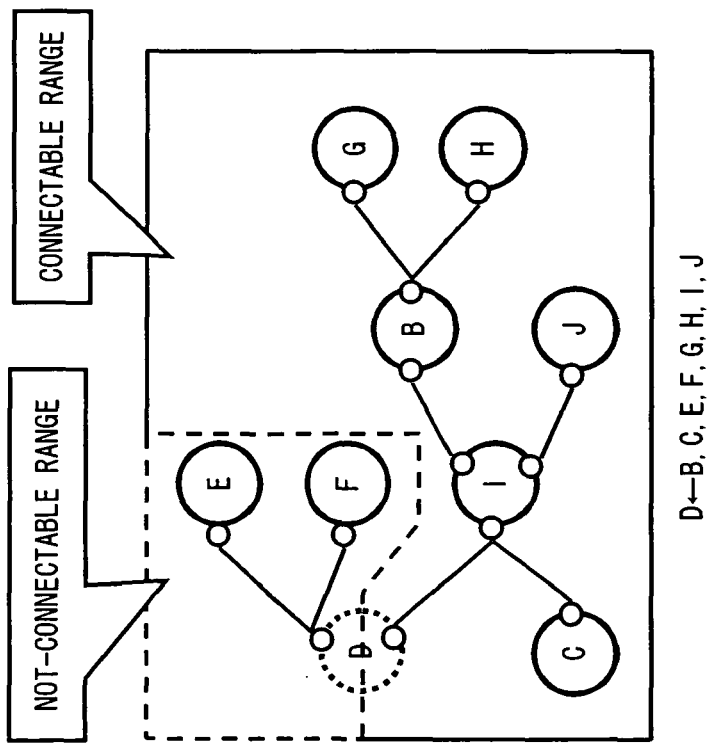
FIG. 18

FIG. 21

| TRANSMITTER \ DESTINATION | A | B | I | K | C | D | M | E | F | J | L | G | H |
|---|---|---|---|---|---|---|---|---|---|---|---|---|---|
| AT NORMAL | | | | | | | | | | | | | |
| A | 1 | O | x | x | x | x | x | x | x | x | x | x | x |
| B | O | 1 | O | x | x | x | x | x | x | x | x | x | x |
| I | x | O | 1 | O | O | O | x | x | x | O | x | x | x |
| K | x | x | O | 1 | O | O | x | x | x | x | x | x | x |
| C | x | x | O | O | 1 | O | x | x | x | x | x | x | x |
| D | x | x | O | O | O | 1 | O | O | O | x | x | x | x |
| M | x | x | x | x | x | O | 1 | O | O | x | x | x | x |
| E | x | x | x | x | x | O | O | 1 | O | x | x | x | x |
| F | x | x | x | x | x | O | O | O | 1 | x | x | x | x |
| J | x | x | O | x | x | x | x | x | x | 1 | O | O | O |
| L | x | x | x | x | x | x | x | x | x | O | 1 | O | O |
| G | x | x | x | x | x | x | x | x | x | O | O | 1 | O |
| H | x | x | x | x | x | x | x | x | x | O | O | O | 1 |
| AT FAULT OCCURRENCE | | | | | | | | | | | | | |
| A | 1 | O | x | x | x | x | x | x | x | x | x | x | x |
| B | O | 1 | O | x | x | x | x | x | x | x | x | x | x |
| I | x | O | 1 | O | O | O | x | x | x | O | x | x | x |
| K | x | x | O | 1 | O | O | x | x | x | x | x | x | x |
| C | x | x | O | O | 1 | O | x | x | x | x | x | x | x |
| D | x | x | O | O | O | 1 | O | x | x | x | x | x | x |
| M | x | x | x | x | x | O | 1 | O | O | x | x | x | x |
| E | x | x | x | x | x | x | O | 1 | O | x | x | x | x |
| F | x | x | x | x | x | x | O | O | 1 | x | x | x | x |
| J | x | x | O | x | x | x | x | x | x | 1 | O | O | O |
| L | x | x | x | x | x | x | x | x | x | O | 1 | O | O |
| G | x | x | x | x | x | x | x | x | x | O | O | 1 | O |
| H | x | x | x | x | x | x | x | x | x | O | O | O | 1 |

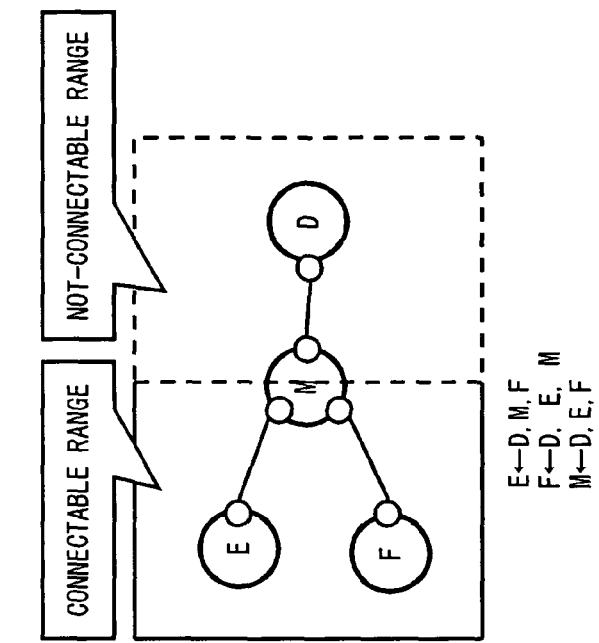
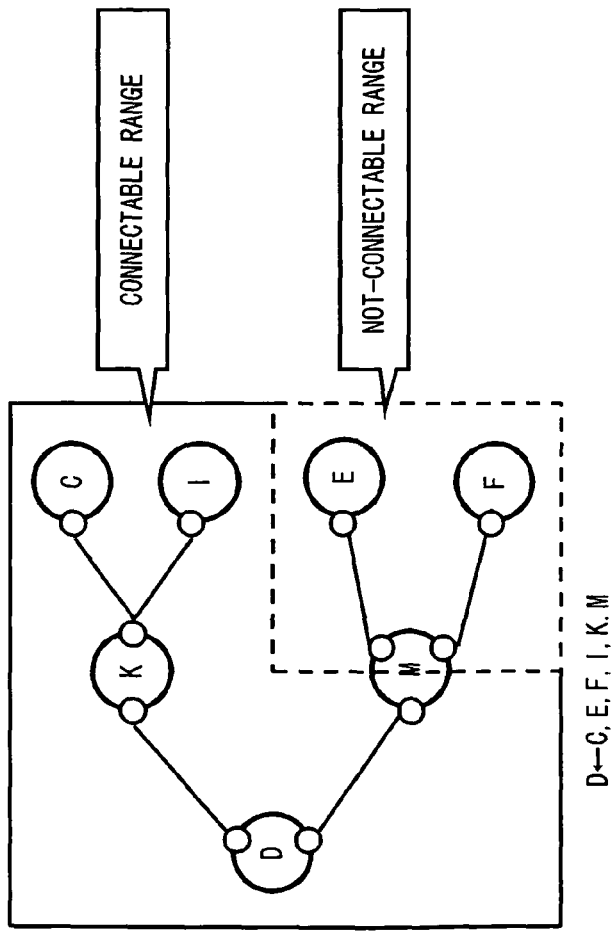
FIG. 23

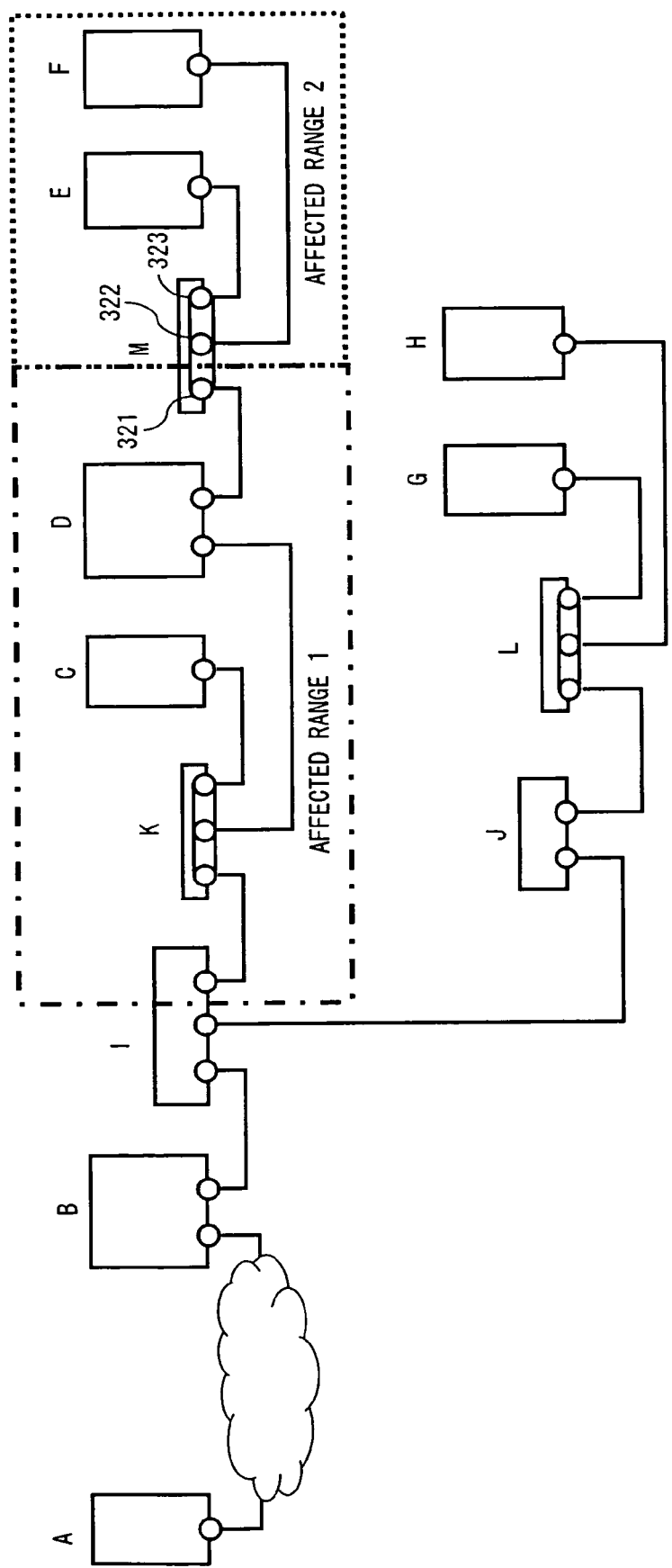
F I G. 24

FIG. 26

| | DESTINATION / TRANSMITTER | A | B | I | K | C | D | M | E | F | J | L | G | H |
|---|---|---|---|---|---|---|---|---|---|---|---|---|---|---|
| AT NORMAL | A | — | × | × | × | × | × | × | × | × | × | × | × | × |
| | B | ○ | — | ○ | × | × | × | × | × | × | × | × | × | × |
| | I | × | ○ | — | ○ | × | × | × | × | × | ○ | × | × | × |
| | K | × | × | ○ | — | ○ | ○ | × | × | × | × | × | × | × |
| | C | × | × | × | ○ | — | × | × | × | × | × | × | × | × |
| | D | × | × | × | ○ | × | — | ○ | × | × | × | × | × | × |
| | M | × | × | × | × | × | ○ | — | ○ | ○ | × | × | × | × |
| | E | × | × | × | × | × | × | ○ | — | × | × | × | × | × |
| | F | × | × | × | × | × | × | ○ | × | — | × | × | × | × |
| | J | × | × | ○ | × | × | × | × | × | × | — | ○ | × | × |
| | L | × | × | × | × | × | × | × | × | × | ○ | — | ○ | ○ |
| | G | × | × | × | × | × | × | × | × | × | × | ○ | — | × |
| | H | × | × | × | × | × | × | × | × | × | × | ○ | × | — |
| AT FAULT OCCURRENCE | A | — | × | × | × | × | × | × | × | × | × | × | × | × |
| | B | ○ | — | ○ | × | × | × | × | × | × | × | × | × | × |
| | I | × | ○ | — | ○ | × | × | × | × | × | ○ | × | × | × |
| | K | × | × | ○ | — | ○ | ○ | × | × | × | × | × | × | × |
| | C | × | × | × | ○ | — | × | × | × | × | × | × | × | × |
| | D | × | × | × | ○ | × | — | ○ | × | × | × | × | × | × |
| | M | × | × | × | × | × | ○ | — | ○ | ○ | × | × | × | × |
| | E | × | × | × | × | × | × | ○ | — | × | ○ | × | × | × |
| | F | × | × | × | × | × | × | ○ | × | — | × | × | × | × |
| | J | × | × | ○ | × | × | × | × | × | × | — | ○ | × | × |
| | L | × | × | × | × | × | × | × | × | × | ○ | — | ○ | ○ |
| | G | × | × | × | × | × | × | × | × | × | × | ○ | — | × |
| | H | × | × | × | × | × | × | × | × | × | × | ○ | × | — |

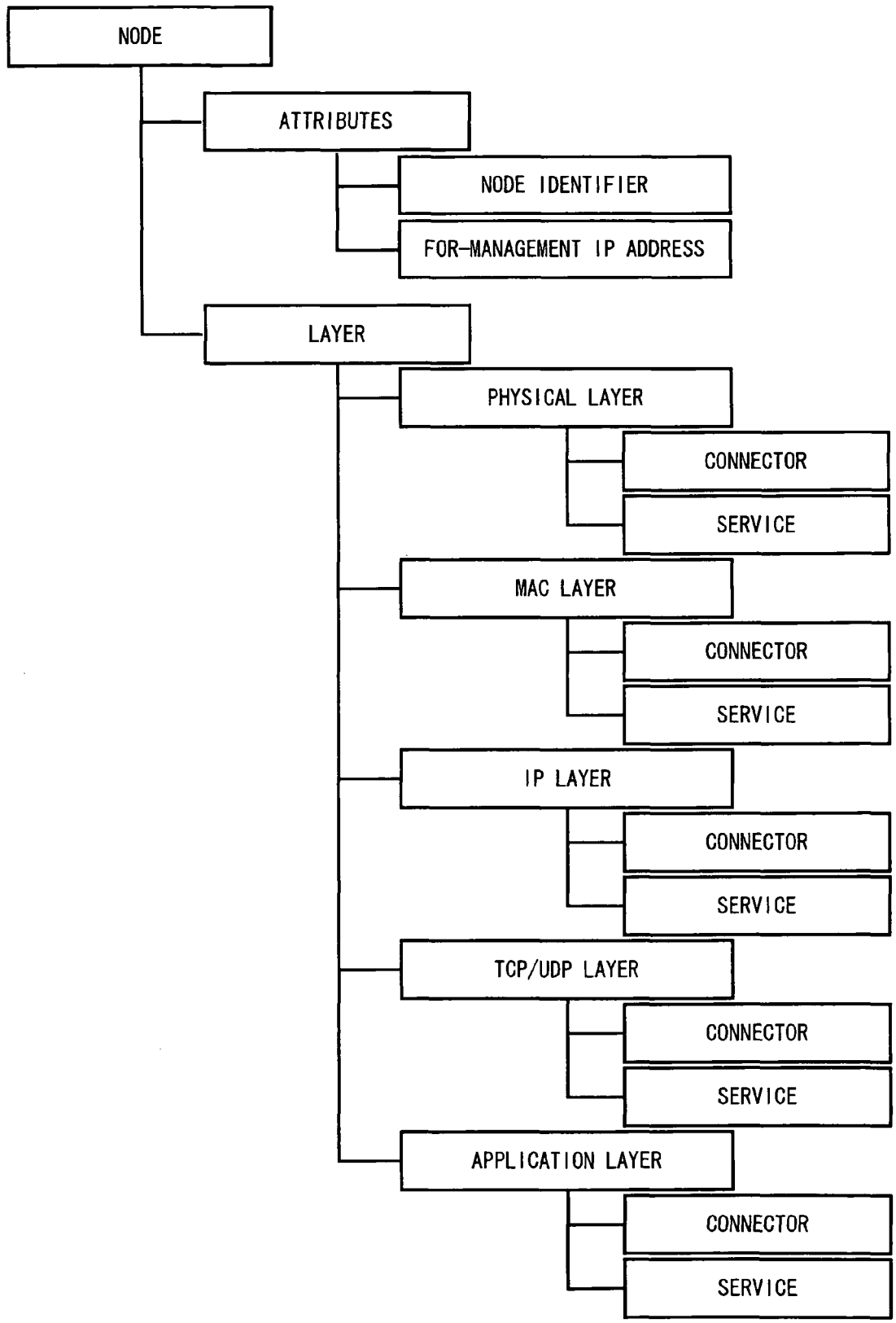
F I G. 3 1

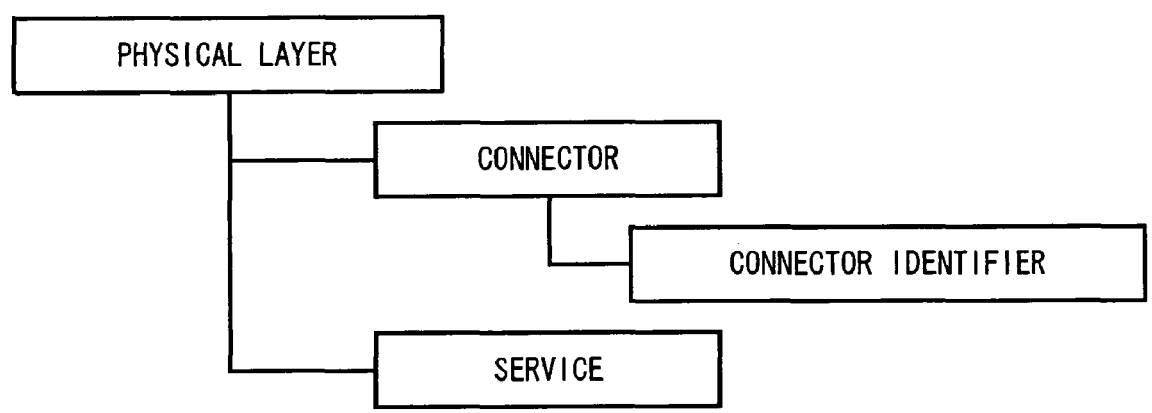
F I G. 36

| NODE NAME | PC_209 | |
|---|---|---|
| DEVICE TYPE | PC | |
| INTERFACE | | |
| | #1 | NUMBER | 1 |
| | | NAME | eth0 |
| | | MAC ADDRESS | 00:00:e2:51:7b:c0 |
| | | IP ADDRESS | 192.168.1.209 |
| ROUTING TABLE | | |
| | #1 | DESTINATION IP | 192.168.2.1 |
| | | TRANSMITTING IF | eth0 |
| | | THE NEXT PATH IP | 192.168.1.1 |
| | | PRIORITY | 1 |
| | #2 | DESTINATION IP | 192.168.10.1 |
| | | TRANSMITTING IF | eth0 |
| | | THE NEXT PATH IP | 192.168.1.1 |
| | | PRIORITY | 1 |

F I G. 4 5

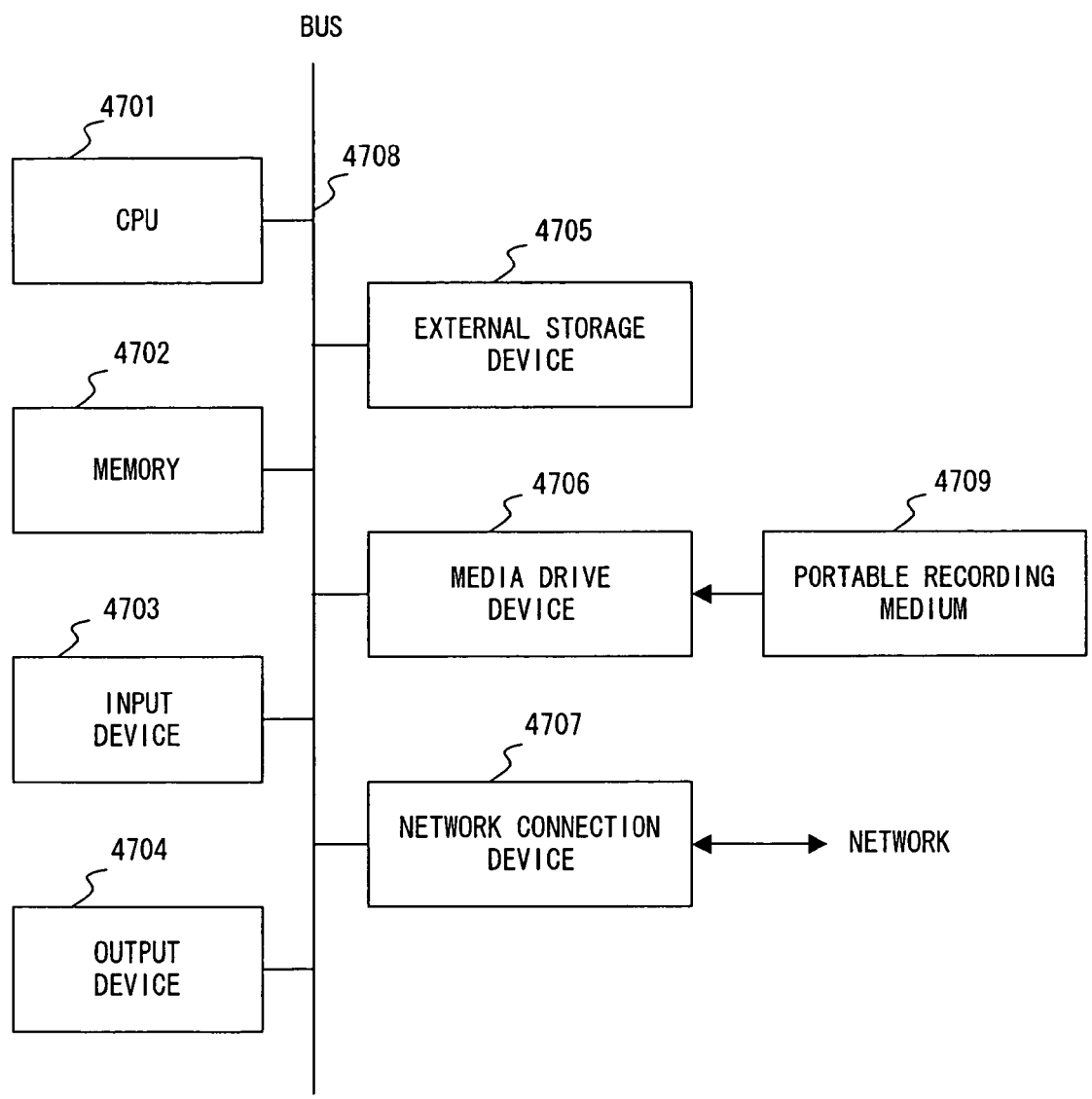
F I G. 4 9

FAULT MANAGEMENT APPARATUS AND METHOD FOR IDENTIFYING CAUSE OF FAULT IN COMMUNICATION NETWORK

BACKGROUND OF THE INVENTION

1. Field of the Invention

The present invention, concerning with an operation management of communication network comprising a plurality of devices, relates to a fault management apparatus and method for identifying a cause of fault in the case that a failure has occurred in the communication.

2. Description of the Related Art

In keeping pace with a propagation of Internet, the problems of network faults are spreading in proportion with a magnification, complication and multi-functionalization in Internet data centers (IDCs), diverse service providers (xSP), intra-enterprise networks, et cetera. In such fault occurrences, it is vital for a network manager to be enabled for identifying an affected range and occurrence point of a fault (e.g., on which layer of which device) quickly so that he or she can identify the cause of the failure and perform the restoration.

What is known for the conventional fault monitoring system is the one for checking an availability and state of two-point communication by using a ping (Packet Internet Groper), SNMP (Simple Network Management Protocol), etcetera. Also proposed is an apparatus for displaying information so as to make an affected range of fault occurring in a network easily comprehensible (e.g., refer to Patent Document 1 noted below). Patent Document 1: Japanese patent application publication No. 2004-222105

In the above noted conventional fault monitoring system, however, even if the fact of fault in a two-point communication is known, a cause in which layer of which device cannot be identified. This will require the network manager to identify the device or line where the fault is occurring eventually based on his experience and know-how, ending up with a failure to identify an affected range or occurrence point of the fault correctly, or a period of time to consume before it is identified.

SUMMARY OF THE INVENTION

An object of the present invention is to provide a fault management apparatus and method capable of identifying an occurrence point without relying on a skill of a manager on whichever layer of a communication network a fault occurs.

A fault management apparatus according to the present invention comprises an input, generation, storage, identification and output devices; and identifies a cause of fault in a communication network having a communication function in a hierarchical structure of a plurality of layers.

The input device inputs monitor information specifying a transmitter and a destination as a monitoring target. The generation device generates communication availability information indicating availability of communication between a plurality of transmitters and a plurality of destinations on each layer before and after a communication state between the transmitter and destination as the monitoring target changes from available to unavailable. The storage device stores the generated communication availability information.

The identification device identifies and device and a layer as a cause of fault by repeating, layer by layer starting from a search starting layer toward a lower layer, processes of dividing the communication network into a plurality of affected ranges being affected by the fault by comparing the communication availability information before and after the communication state of the monitoring target changes and grouping the destinations in the paths where the communication state has changed from available to unavailable, and of deducing an interface of a device located at the border between the affected ranges as a fault occurrence point. The output device outputs information about the plurality of affected ranges and the fault occurrence point.

BRIEF DESCRIPTION OF THE DRAWINGS

FIG. 1 shows a principle of fault management apparatus according to the present invention;

FIG. 6 shows a communication availability matrix on the application layer;

FIG. 8 shows a second set of tree diagrams of a communication availability matrix on the application layer;

FIG. 11 shows a communication availability matrix on the TCP/UDP layer;

FIG. 13 shows a second set of tree diagrams of a communication availability matrix on the TCP/UDP layer;

FIG. 14 shows affected ranges of fault on the TCP/UDP layer;

FIG. 16 shows a communication availability matrix on the IP layer;

FIG. 18 shows a second set of tree diagrams of a communication availability matrix on the IP layer;

FIG. 21 shows a communication availability matrix on the MAC layer;

FIG. 23 shows a second set of tree diagrams of a communication availability matrix on the MAC layer;

FIG. 24 shows affected ranges of fault on the MAC layer;

FIG. 26 shows a communication availability matrix on the physical layer;

FIG. 31 shows a data structure of node information;

FIG. 36 shows a data structure of a physical layer;

FIG. 45 shows device setup information;

FIG. 49 shows a configuration of an information processing apparatus; and

DESCRIPTION OF THE PREFERRED EMBODIMENTS

Figure 2:
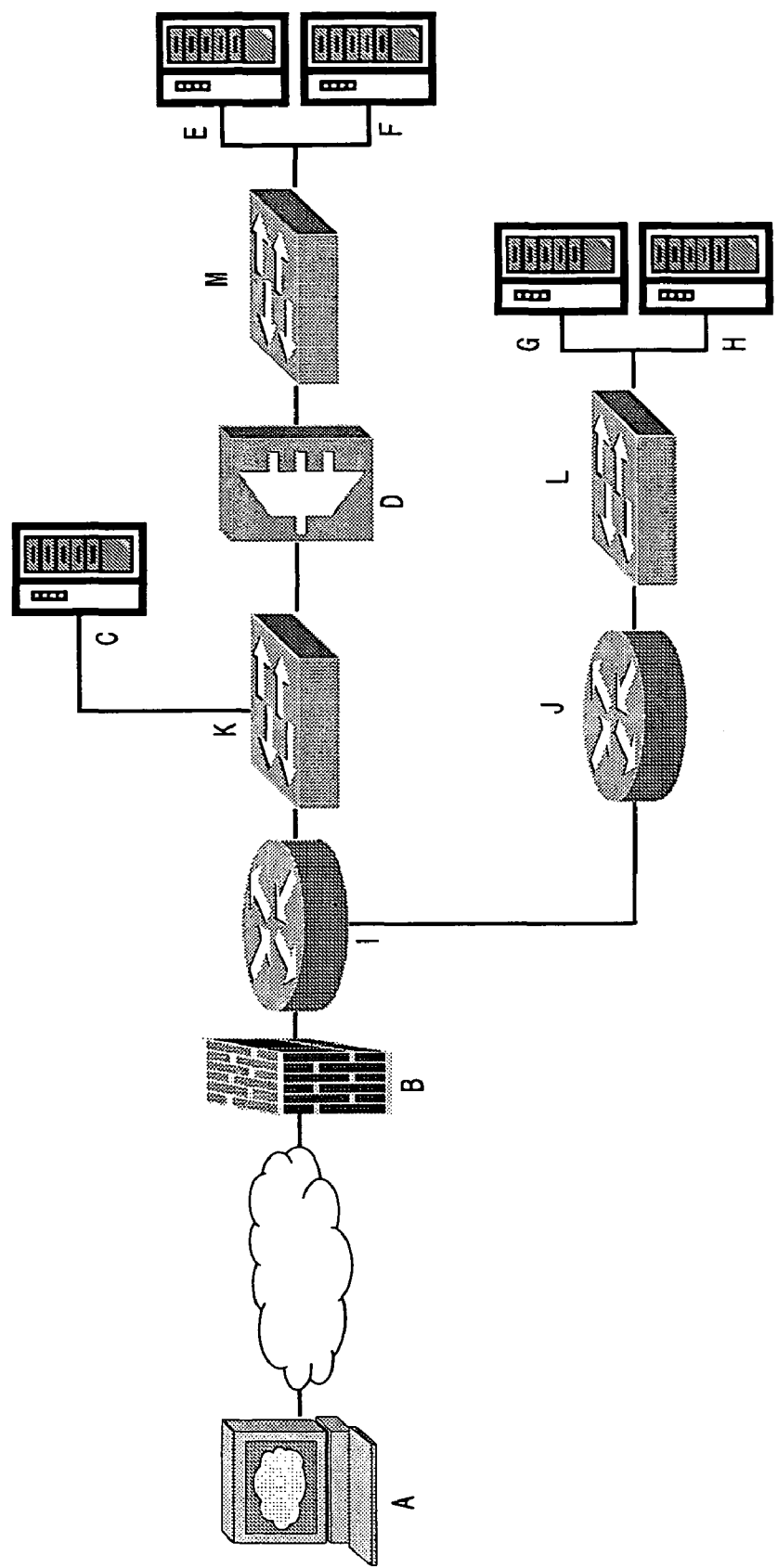
FIG. 2 shows a communication network as a management target.

The following is a detailed description of a preferred embodiment according to the present invention while referring to the accompanying drawings.

FIG. 1 shows the principle of fault management apparatus according to the present invention. The fault management apparatus shown by FIG. 1 comprises an input device 101, a generation device 102, a storage device 103, an identification device 104 and an output device 105; and identifies a cause of fault in a communication network having a communication function in a hierarchical structure of a plurality of layers.

The input device 101 inputs monitor information specifying a transmitter and a destination as a monitoring target. The generation device 102 generates communication availability information indicating availability of communication between a plurality of transmitters and a plurality of destinations on each layer before and after a communication state between the transmitter and destination as the monitoring target changes from available to unavailable. The storage device 103 stores the generated communication availability information.

The identification device 104 identifies an device and a layer as a cause of fault by repeating, layer by layer starting from a search starting layer toward a lower layer, processes of dividing the communication network into a plurality of affected ranges being affected by the fault by comparing the communication availability information before and after the communication state of the monitoring target changes and grouping the destinations in the paths where the communication state has changed from available to unavailable, and of deducing an interface of a device located at the border between the affected ranges as a fault occurrence point. The output device 105 outputs information about the plurality of affected ranges and the fault occurrence point.

Such configured fault management apparatus checks a communication availability between devices on layer by layer starting from a search starting layer toward the lower layers in a plurality of layers to narrow down to a fault occurrence point, thereby identifying the device and layer as the cause of the fault automatically.

The input device 101 corresponds to a later described input device 4703 shown by FIG. 49 for example, the generation device 102 and identification device 104 correspond to a CPU (Central Processing Unit) 4701 shown by FIG. 49 for example, the storage device 103 corresponds to a memory 4702 or external storage device 4705 shown by FIG. 49 for example, and the output device 105 corresponds to an output device 4704 shown by FIG. 49 for example. Meanwhile, communication availability information corresponds to each of later described communication availability matrices to be shown by FIGS. 6, 11, 16, 21 and 26.

The present invention makes it possible to identify an occurrence point of fault on an arbitrary layer of a communication network automatically without relying on a skill of a network manager.

The fault management apparatus according to the present embodiment recognizes a network configuration, the communication paths at the normal and abnormal conditions and a communication availability based on topology information obtainable from the devices, and identifies the fault occurring device and the service of the device based on the recognized information to display on a screen. Topology is defined as physical and logical connection configurations among devices constituting a network.

FIG. 2 shows an example of communication network as a management target. The communication network comprises devices of a client computer A, a firewall B, a DNS (Domain Name System) server C, a load balancer D, web servers E and F, an application server G, a data base server H, routers I and J, and switches K, L and M; and has a communication function in a hierarchical structure of a plurality of layers. Let it assume here that there are five layers from the upper toward lower layers as follows:

(1) Application Layer

Assigned to the physical connection, et cetera, between services;

(2) Transmission Control Protocol/User Datagram Protocol (TCP/UDP) Layer

Assigned to a logical connection through filtering, address conversion, load balancer, et cetera;

(3) Internet Protocol (IP) Layer

Assigned to a logical connection between subnets;

(4) Media Access Control (MAC) Layer

Assigned to a logical connection, et cetera, through a virtual local area network (VLAN); and (5) Physical Layer Assigned to a physical connection by way of a cable.

The firewall B performs a packet filtering on the TCP/UDP layer; each of the routers I and J performs a packet transmission on the IP layer; each of the switches K, L and M performs a packet transfer on the MAC layer. The load balancer D controls a load balancing for the web servers E and F.

The DNS server C provides a name resolution service on the application layer, each of the web servers E and F provide a web service on the application layer, the application server provides a middle ware service on the application layer, the data base server H provides a database service on the application layer. The client computer A uses the services provided by these servers by way of the network.

On each layer, a physical or logical connection is expressed by a "link"; a physical or logical interface of a device used for a link is expressed by a "connector"; a function for terminating a communication or transferring data among a plurality of connectors within an device is expressed by a "service." Each device is expressed by a "node." The topology on each layer is expressed by the three concise elements, i.e., link, connector and service. Each device name will be replaced by the expression "nodes A through M" in the following description.

Figure 3:
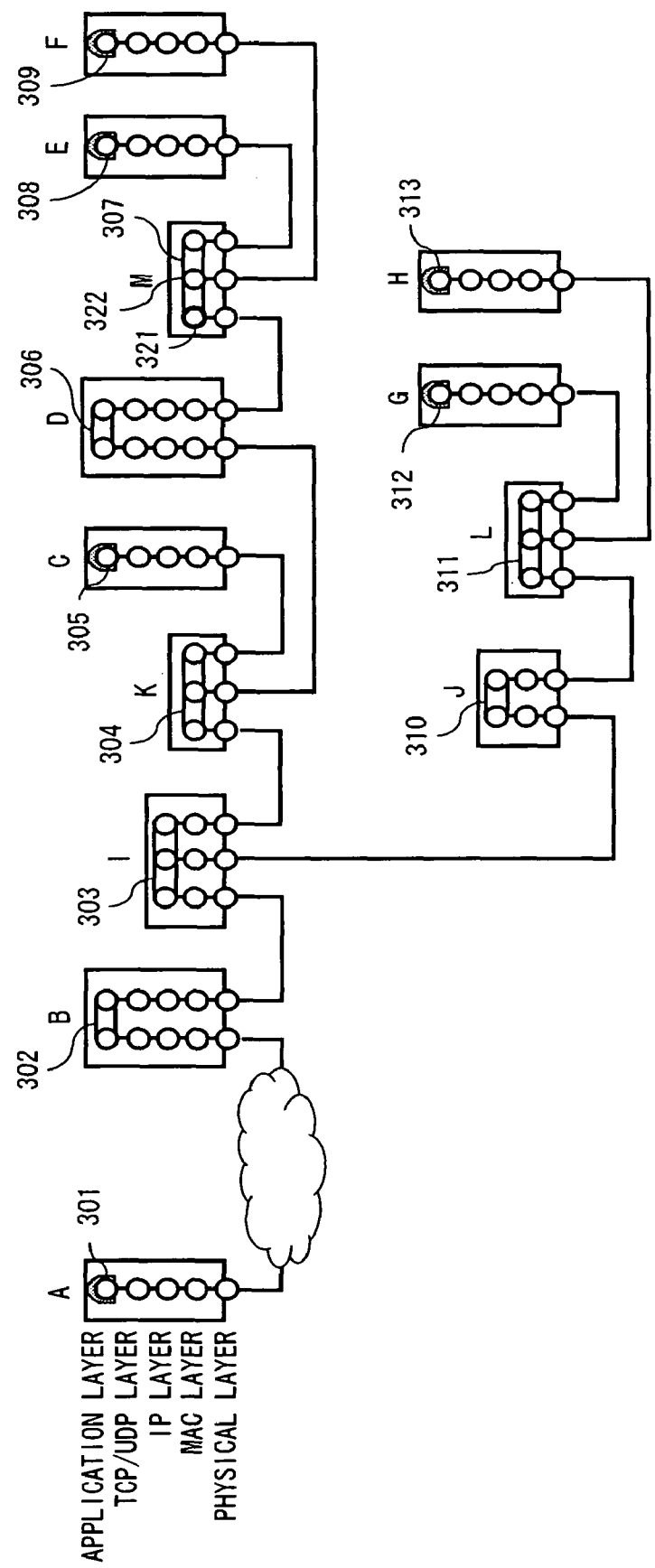
FIG. 3 shows a connector representation of a communication network.

FIG. 3 shows a connector representation of a communication network shown by FIG. 2. The circles drawn within each node represent the connectors. The nodes A, B, C, D, E, F, G and H have connectors of all layers; the nodes I and J have connectors of the IP, MAC and physical layers; and the nodes K, M and L have connectors of the MAC and physical layers.

The following are the services for terminating communication on the application layer, i.e., the service 301 of node A, service 305 of node C, service 308 of node E, service 309 of node F, service 312 of node G and service 313 of node H.

And, the service 302 of node B and the service 306 of node D are the ones for transferring data between the connectors on the application layer within the respective nodes, the service 303 of node I and the service 310 of node J are the ones for transferring data between the connectors on the IP layer within the respective nodes, the service 304 of node K, service 311 of node L and service 307 of node M are the ones for transferring data between the connectors on the MAC layer within the respective nodes.

It is possible to express a link on each layer by a plurality of links on a lower layer by expressing the topologies of respective layers in a stack. This means, if a link is severed by a fault on a lower layer, a link on the upper layer will also be severed as a result of the fault. Therefore, it is possible to deduce an affected range and occurrence point of a fault in a specific service by drilling down from an upper to lower layers in search of the affected range and occurrence point of the fault on each layer.

Accordingly, the fault management apparatus creates a communication availability matrix for the pre- and post-fault occurrence for each layer to display the affected range and occurrence point of the fault deduced from the matrix on a display screen. The communication availability matrix is the resultant of investigating an availability of communication in the pre- and post-fault occurrence between two nodes based on input information, which are expressed in the matrix.

A fault is exemplified by an error in the connector 321 on the MAC layer of the node M for the VLAN setting where a connector other than the correct connector 322 has been set for VLAN, in the following description. Fault occurrence, however, is not limited to one point but fault can occur at a plurality of points, in which case the affected ranges and occurrence points can be deduced as well.

Now, the first description is about a method for deducing a fault occurrence point on the application layer while referring to FIGS. 4 through 9.

Figure 4:
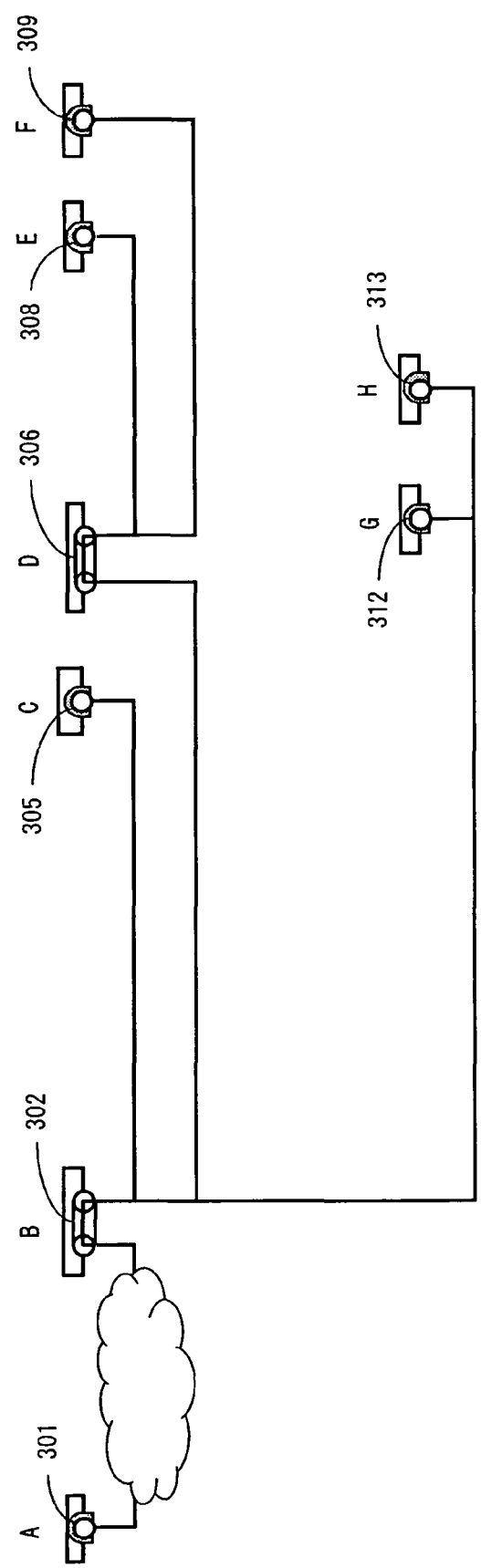
FIG. 4 shows a topology of an application layer.
Figure 5:
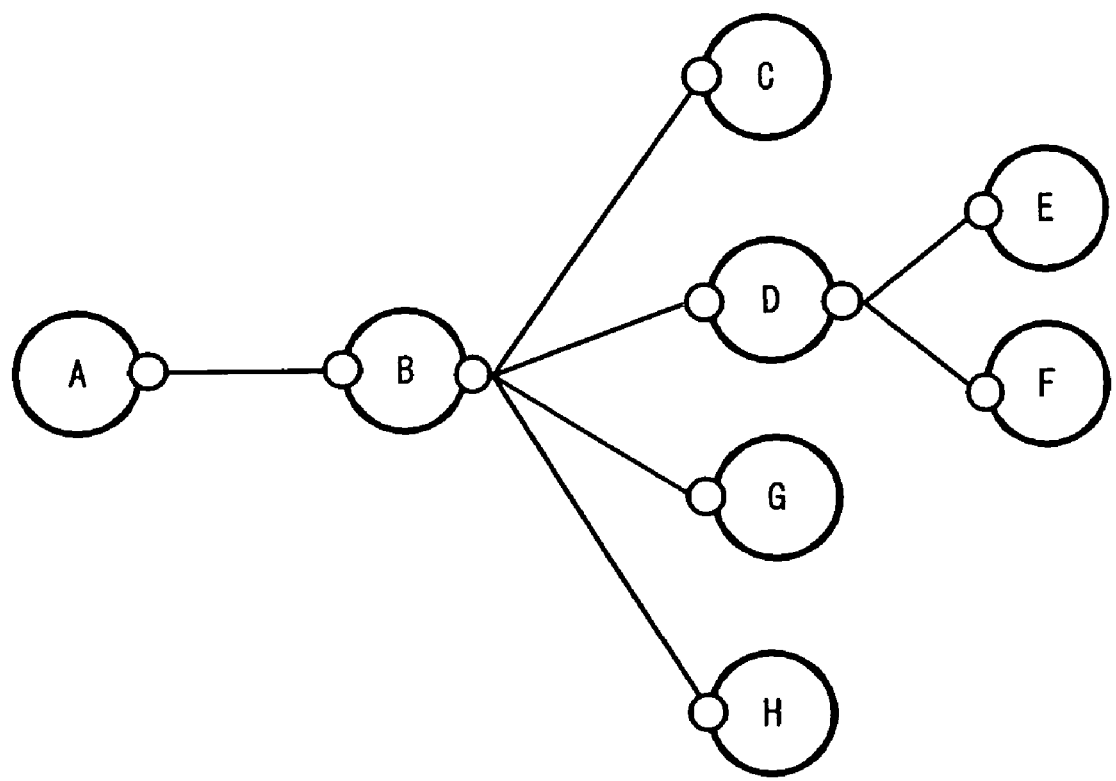
FIG. 5 shows a tree diagram of the application layer.

FIG. 4 shows a topology (links, connectors and services) of the application layer of the network shown by FIG. 2. The connection relationship among the connectors on this layer can be shown by a tree diagram as shown by FIG. 5.

FIG. 6 shows a communication availability matrix in the application layer. The node in each row and column represents the transmitter and destination, respectively, for communication, with "at normal" and "at fault occurrence" showing the respective matrices for the pre- and post-fault occurrence. The circle and symbol "X" mean an availability and unavailability of communication, respectively, and the dash "-" means exclusion from communication.

Since a web service is a subject of communication here, the nodes A through D are not selected as the destinations. Meanwhile, the client A can communicate with the web servers E and F, but not with the application server G or the data base server H, in the normal state.

The shaded portions in the "at fault occurrence" matrix show the paths where a change occurred from the "at normal" matrix. Here, the following paths are changed from the communication being available to unavailable, i.e., nodes A through D, and G through H with node E; nodes A through D, and G through H with node F; nodes E through F with node G; and nodes E through F with node H. These paths are now incommunicable due to the effect of the fault occurrence on the MAC layer.

The fault management apparatus compares the communication availability and unavailability at the pre- and post-fault for the same path in the communication availability matrix, and, as a result, divides an affected range by grouping the columns containing the path where the change occurred in the communication availability to narrow down the fault occurrence point.

Figure 7:
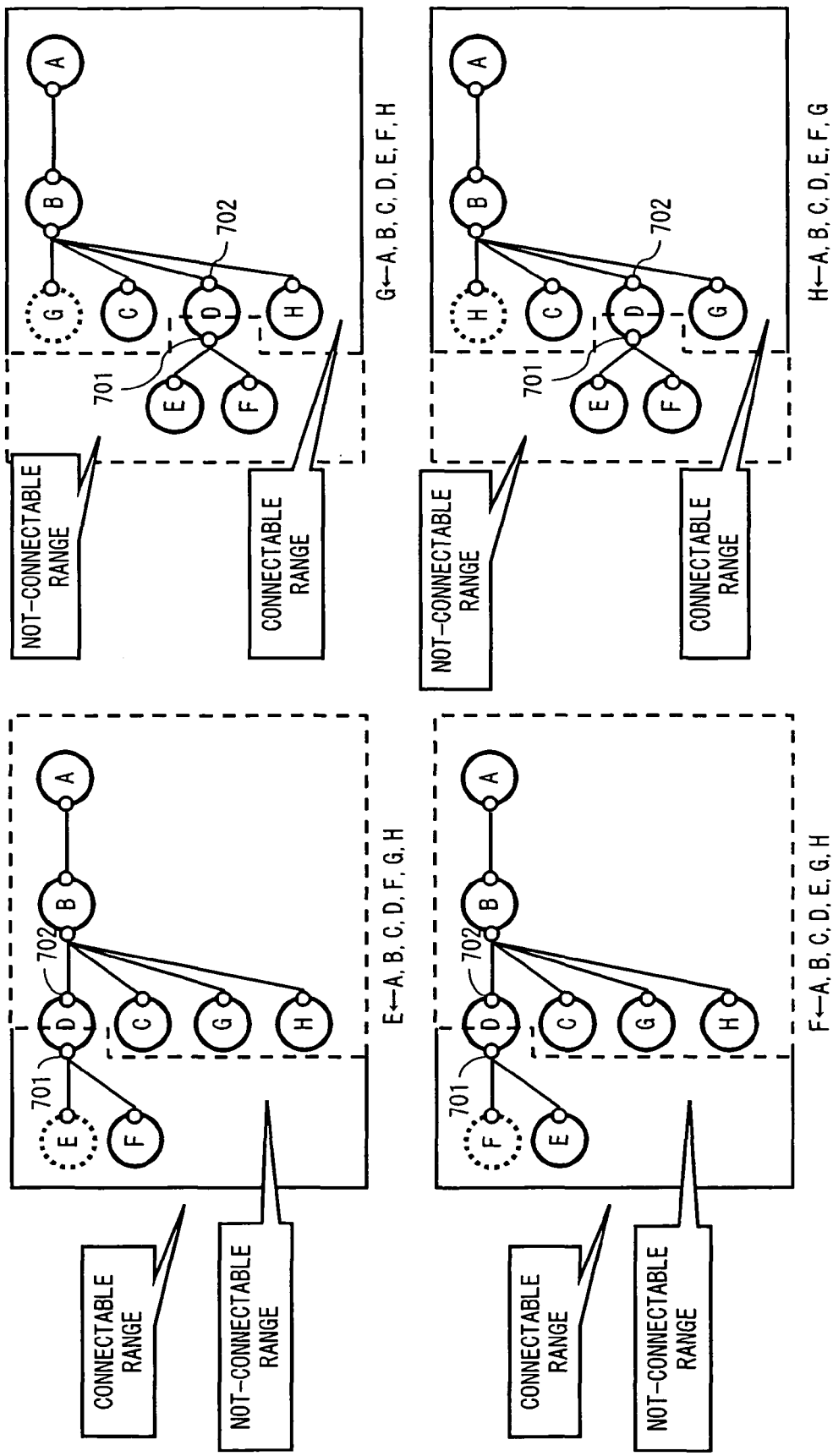
FIG. 7 shows a first set of tree diagrams of a communication availability matrix on the application layer.

At this point, grouping the connectors of each node into connectable (i.e., communicable) connectors with each connector of the destinations E, F, G and H, and not-connectable therewith in order to divide the tree diagram shown by FIG. 5 into the connectable range and not-connectable range, a result as shown by FIG. 7 is obtained. For example, with the connector of node E, it is possible to find out that the connector of node F and the connector 701 of node D are only connectable, while the connector 702 of node D or connectors of other nodes are not connectable. Furthermore, merging the tree diagrams of destinations E and F, and merging the tree diagrams of the destinations G and H gain the result as shown by FIG. 8.

Figure 9:
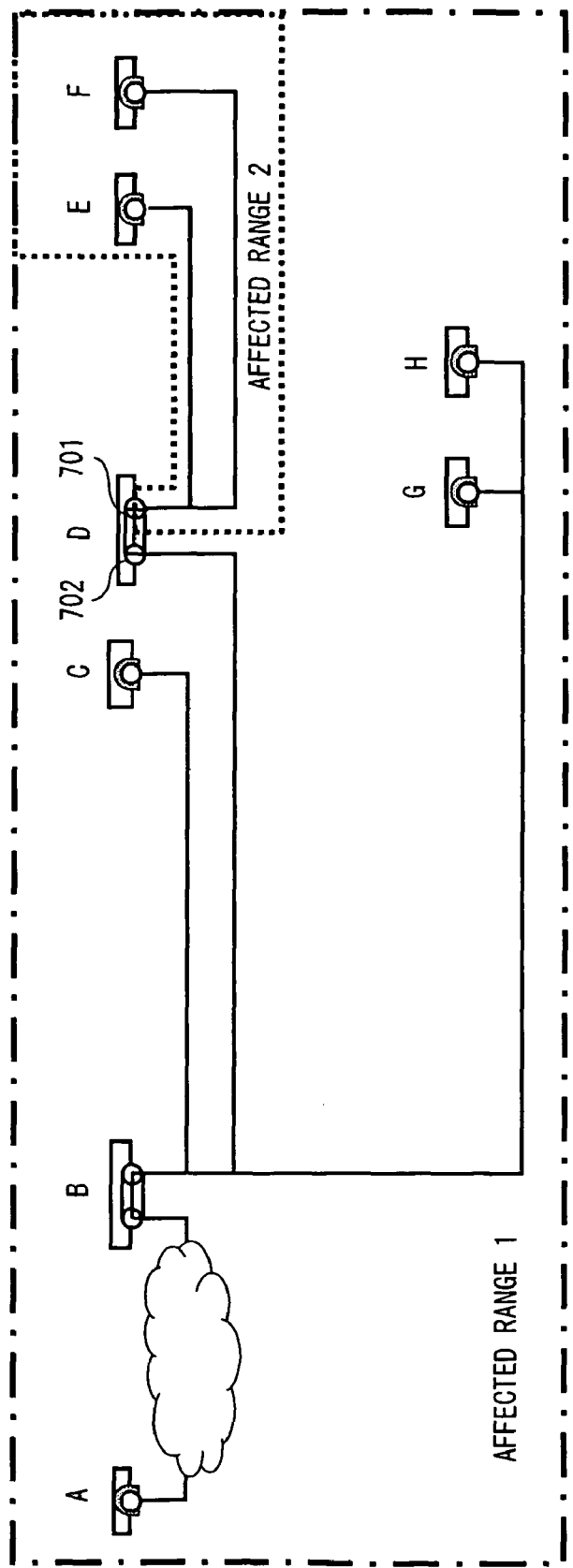
FIG. 9 shows affected ranges of fault on the application layer.

The fault management apparatus decides the affected range of the fault can be divided into two ranges because the two tree diagrams shown by FIG. 8 contradict each other (i.e., the connectable range and not-connectable range are mutually switched from each other), and creates the affected ranges 1 and 2 on the application layer as shown by FIG. 9.

In this case, communications between nodes are available within the each affected range, while communications between nodes across the affected ranges are not available. Furthermore, the point where the border line between the affected ranges crosses with the network connection is found to be the fault border point, hence deducing that the two connectors 701 and 702 sandwiching the fault border point is the fault occurrence point.

Here, since a plurality of nodes E and F are connected with the connector 701 which has been deduced as the fault occurrence point, the fault management apparatus decides that the cause of the fault exists on a lower layer and accordingly continues to search thereon. Therefore, the similar processing is performed on the one layer below, that is, on the TCP/UDP layer.

The next description is about a method for deducing a fault occurrence point on the TCP/UDP layer while referring to FIGS. 10 through 14.

Figure 10:
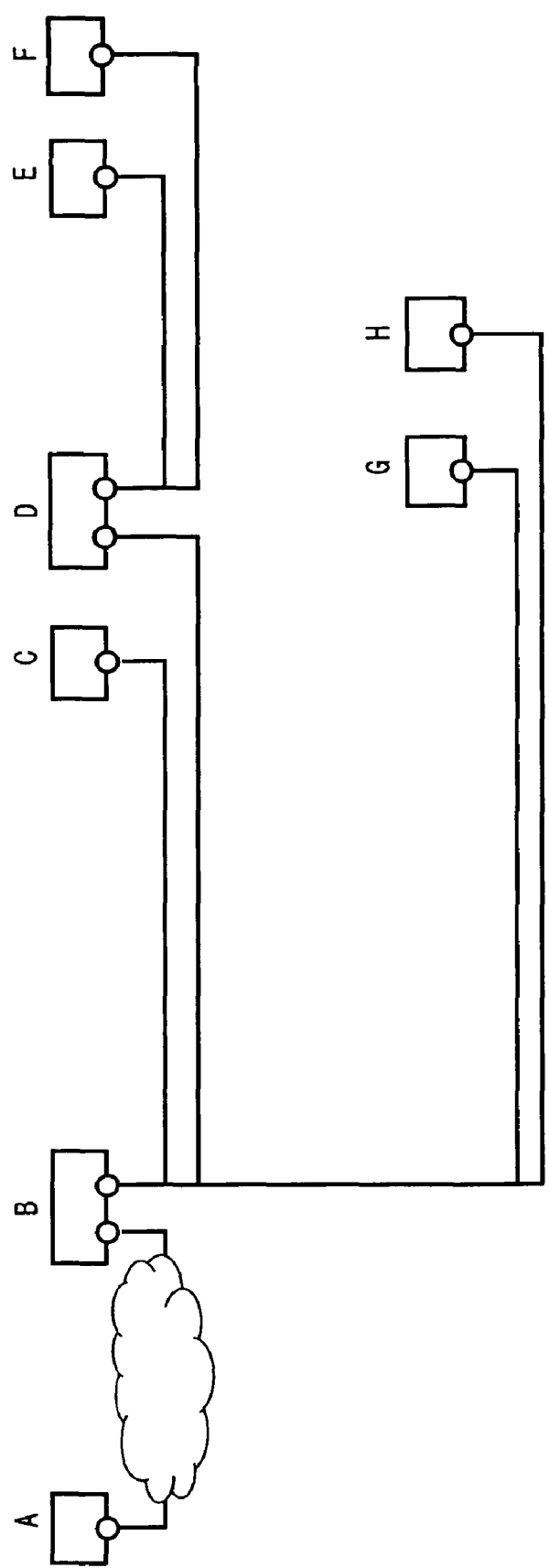
FIG. 10 shows a topology of a TCP/UDP layer.

FIG. 10 shows a topology of TCP/UDP layer of the network shown by FIG. 2; and FIG. 11 shows a communication availability matrix on the TCP/UDP layer. In this matrix, the states of the paths between the nodes D and E, and between the nodes D and F, have become incommunicable at the fault occurrence.

Figure 12:
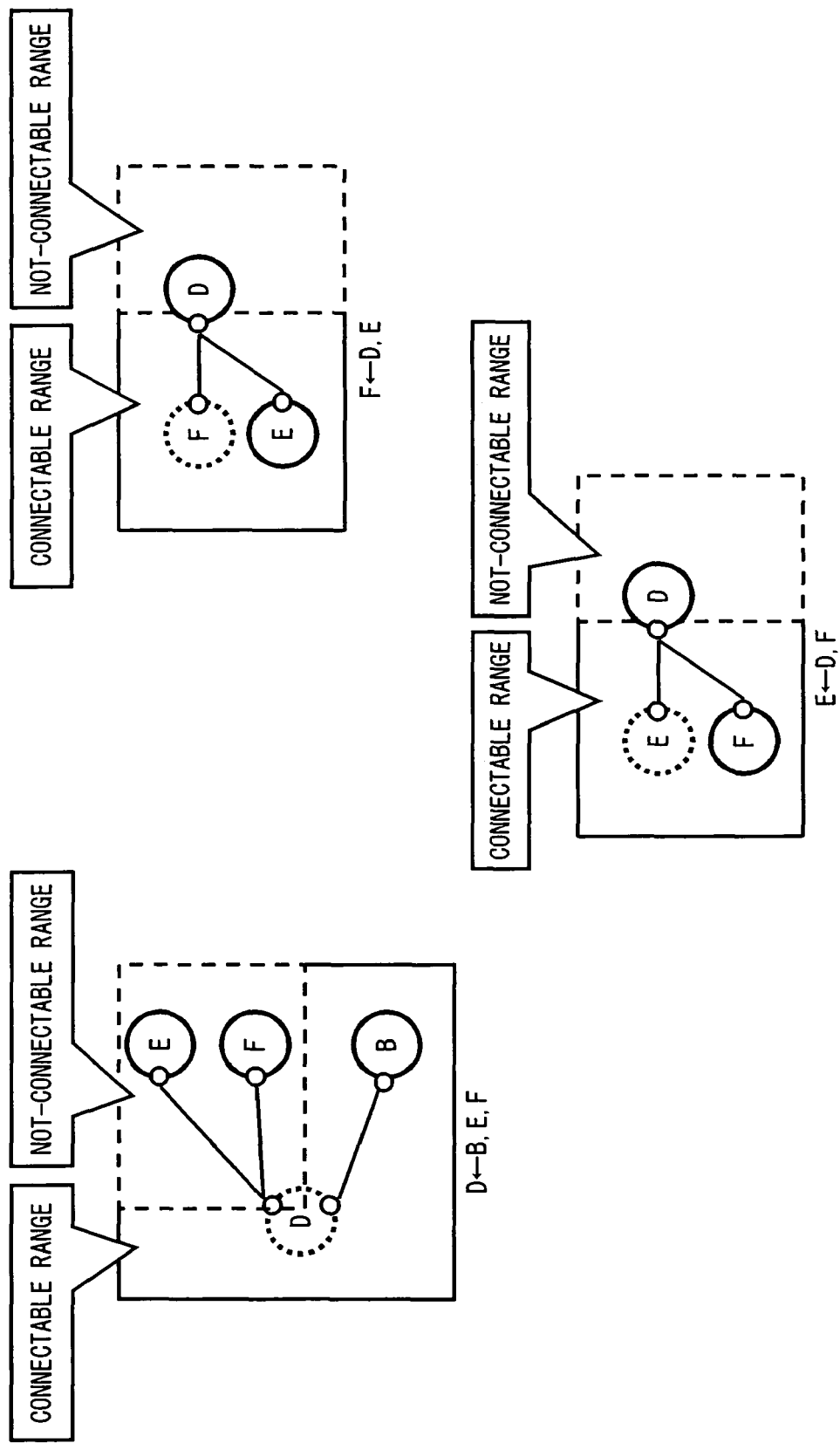
FIG. 12 shows a first set of tree diagrams of a communication availability matrix on the TCP/UDP layer.

In this event, a creation of tree diagrams for indicating the connectable and not-connectable ranges for only the changed destinations D, E and F gains the result as shown by FIG. 12. Furthermore, merging the tree diagrams of the destinations E and F eventually gains the tree diagrams as shown by FIG. 13.

The fault management apparatus creates an affected range 1 and an affected range 2 as shown by FIG. 14 from the two tree diagrams shown by FIG. 13 and deduces that connectors 1401 and 1402 sandwiching the fault border point on the border between the affected ranges as the fault occurrence point. Here, since a plurality of nodes E and F are connected with the connector 1401, the processing continues to search in the lower layer and hence the similar processing is performed on the one layer below, that is, on the IP layer.

The next description is about a method for deducing the fault occurrence point on the IP layer while referring to FIGS. 15 through 18.

Figure 15:
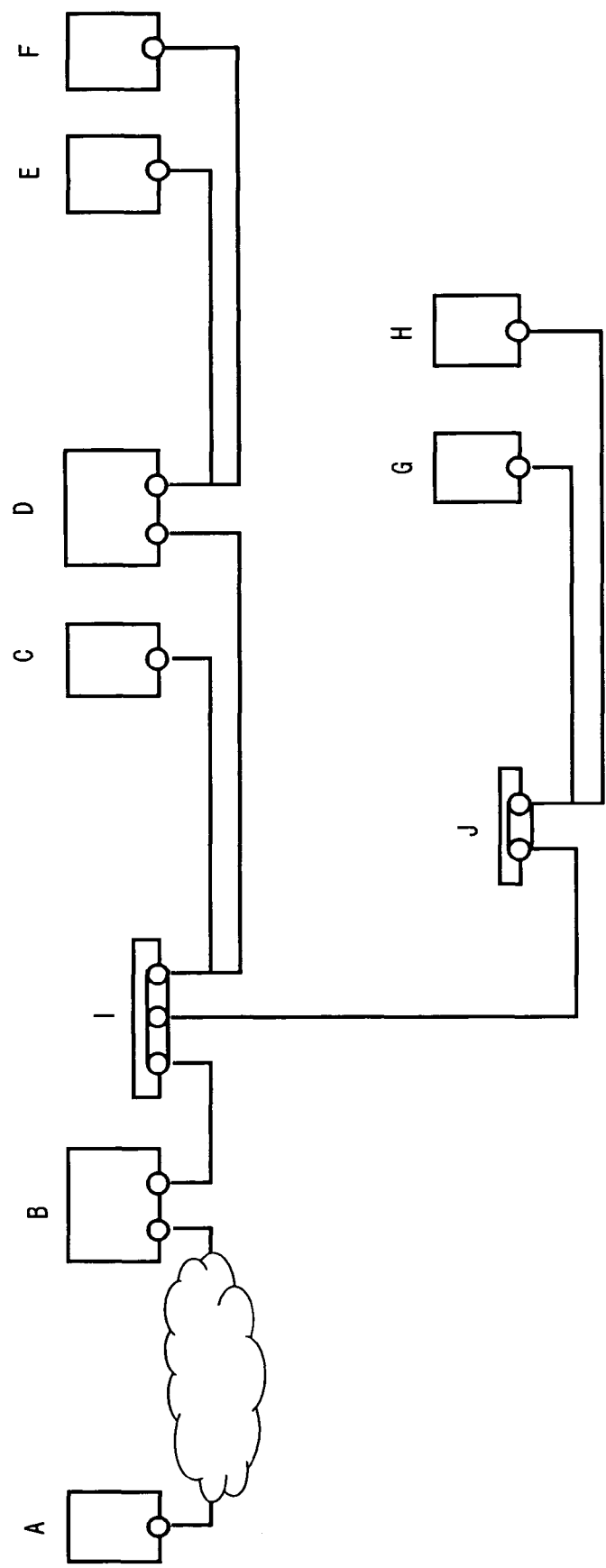
FIG. 15 shows a topology of an IP layer.

FIG. 15 shows a topology of the IP layer of the network shown by FIG. 2; and FIG. 16 shows a communication availability matrix on the IP layer. In this matrix, the states of paths changed at the fault occurrence so that the paths between nodes D and E, and the path between nodes D and F have become incommunicable.

Figure 17:
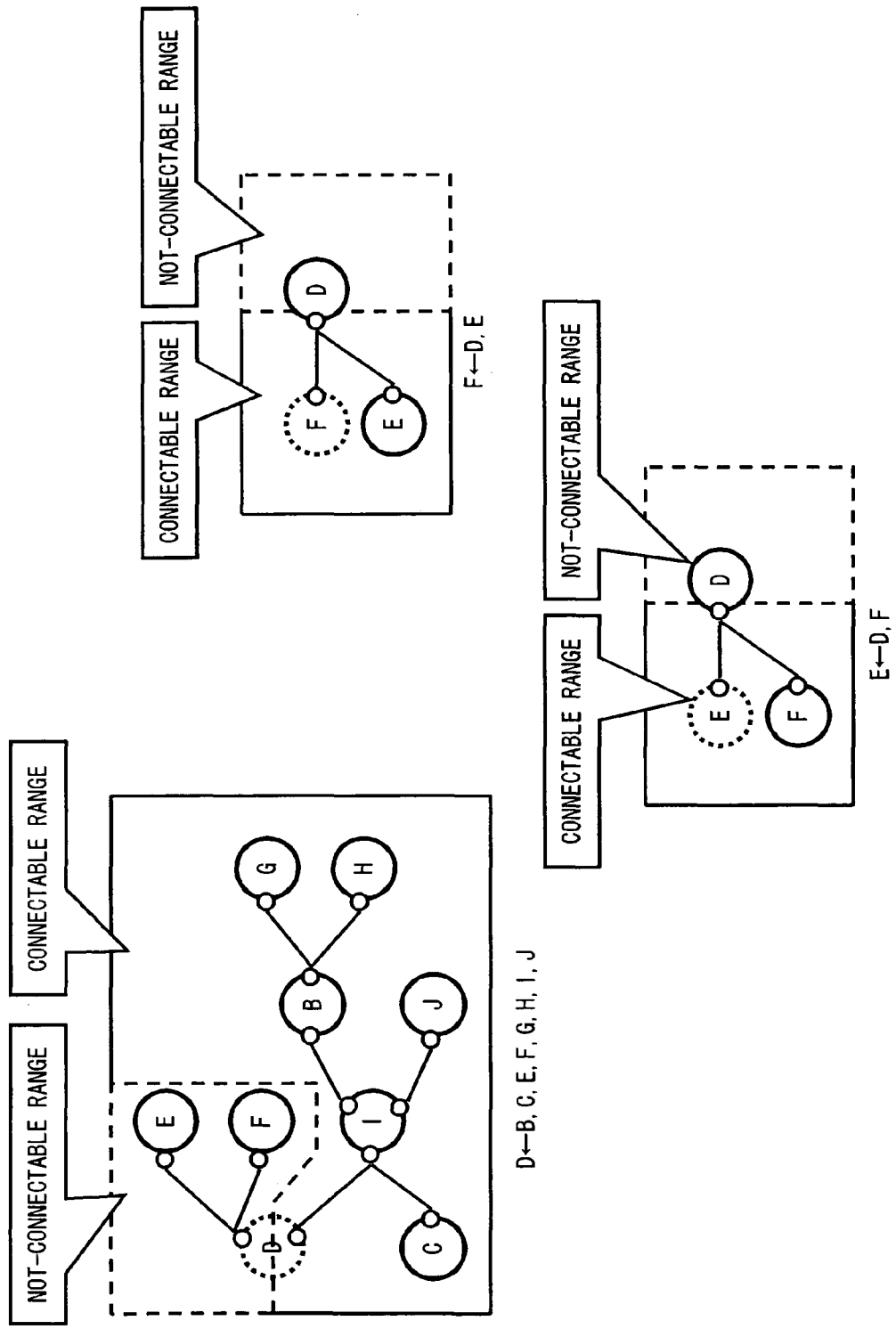
FIG. 17 shows a first set of tree diagrams of a communication availability matrix on the IP layer.

In this event, a creation of tree diagrams for indicating the connectable and not-connectable ranges for only the changed destinations D, E and F gains the result as shown by FIG. 17. Furthermore, merging the tree diagrams of the destinations E and F eventually gains the tree diagrams as shown by FIG. 18.

Figure 19:
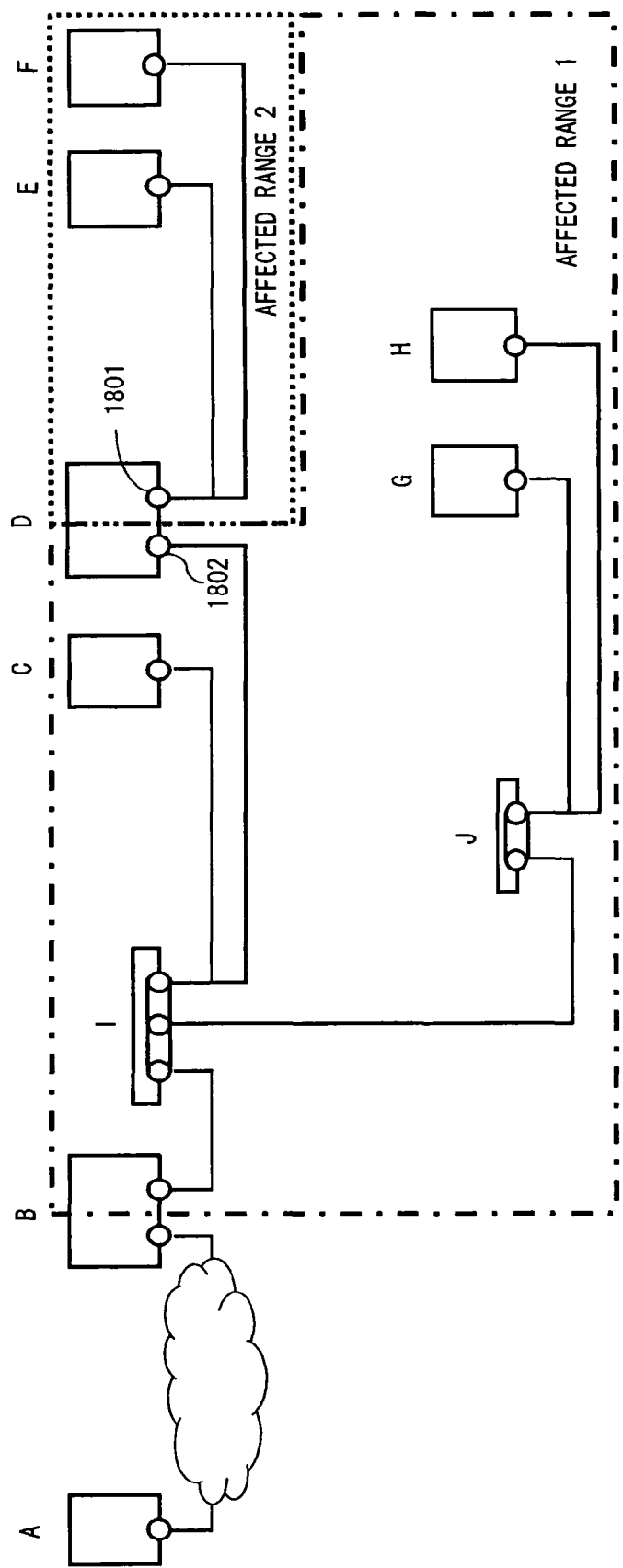
FIG. 19 shows affected ranges of fault on the IP layer.

The fault management apparatus creates an affected range 1 and an affected range 2 as shown by FIG. 19 from the two tree diagrams shown by FIG. 18 and deduces that connectors 1801 and 1802 sandwiching the fault border point on the border between the affected ranges as the fault occurrence point. Here, since a plurality of nodes E and F are connected with the connector 1801, the processing continues to search in the lower layer and hence the similar processing is performed on the one layer below, that is, on the MAC layer.

The next description is about a method for deducing the fault occurrence point on the MAC layer while referring to FIGS. 20 through 24.

Figure 20:
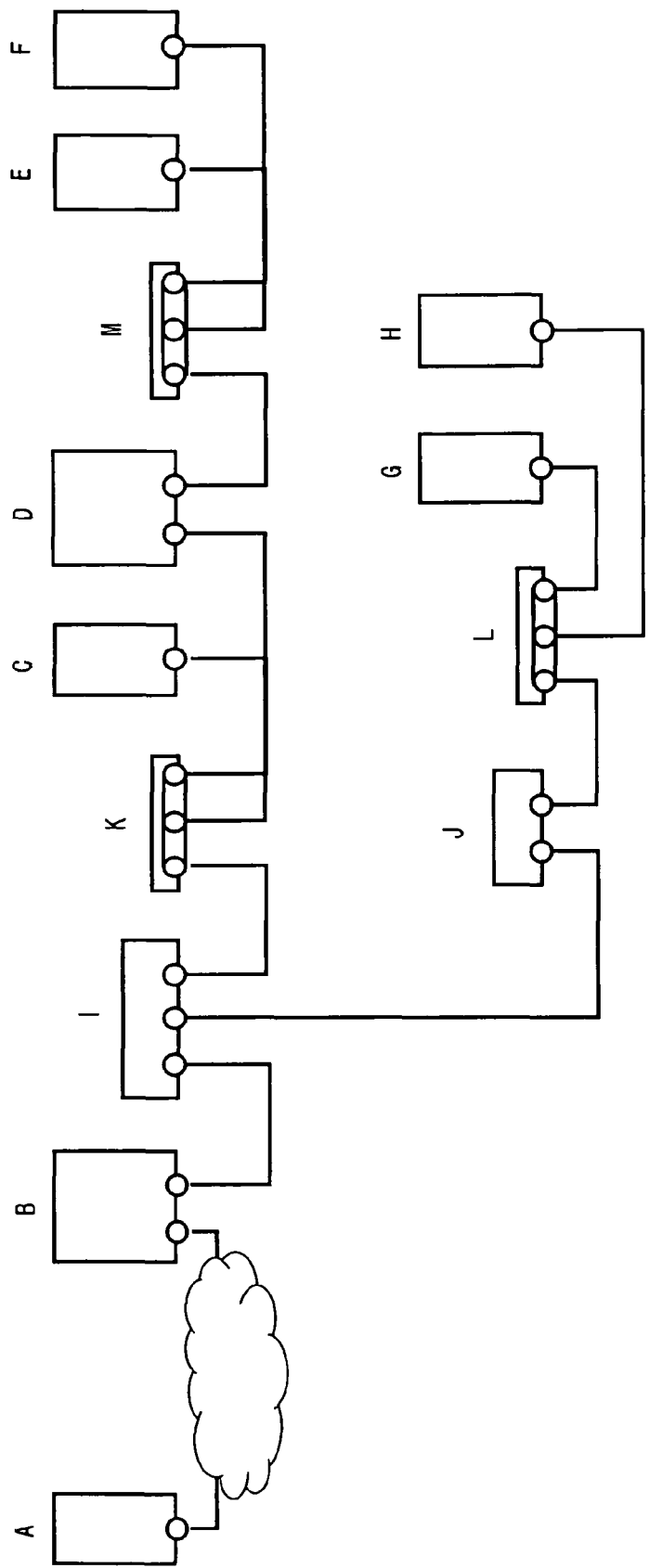
FIG. 20 shows a topology of a MAC layer.

FIG. 20 shows a topology of the MAC layer of the network shown by FIG. 2; and FIG. 21 shows a communication availability matrix on the MAC layer. In this matrix, the states of paths changed at the fault occurrence so that the path between nodes D and E, and the path between nodes D and F have become incommunicable.

Figure 22:
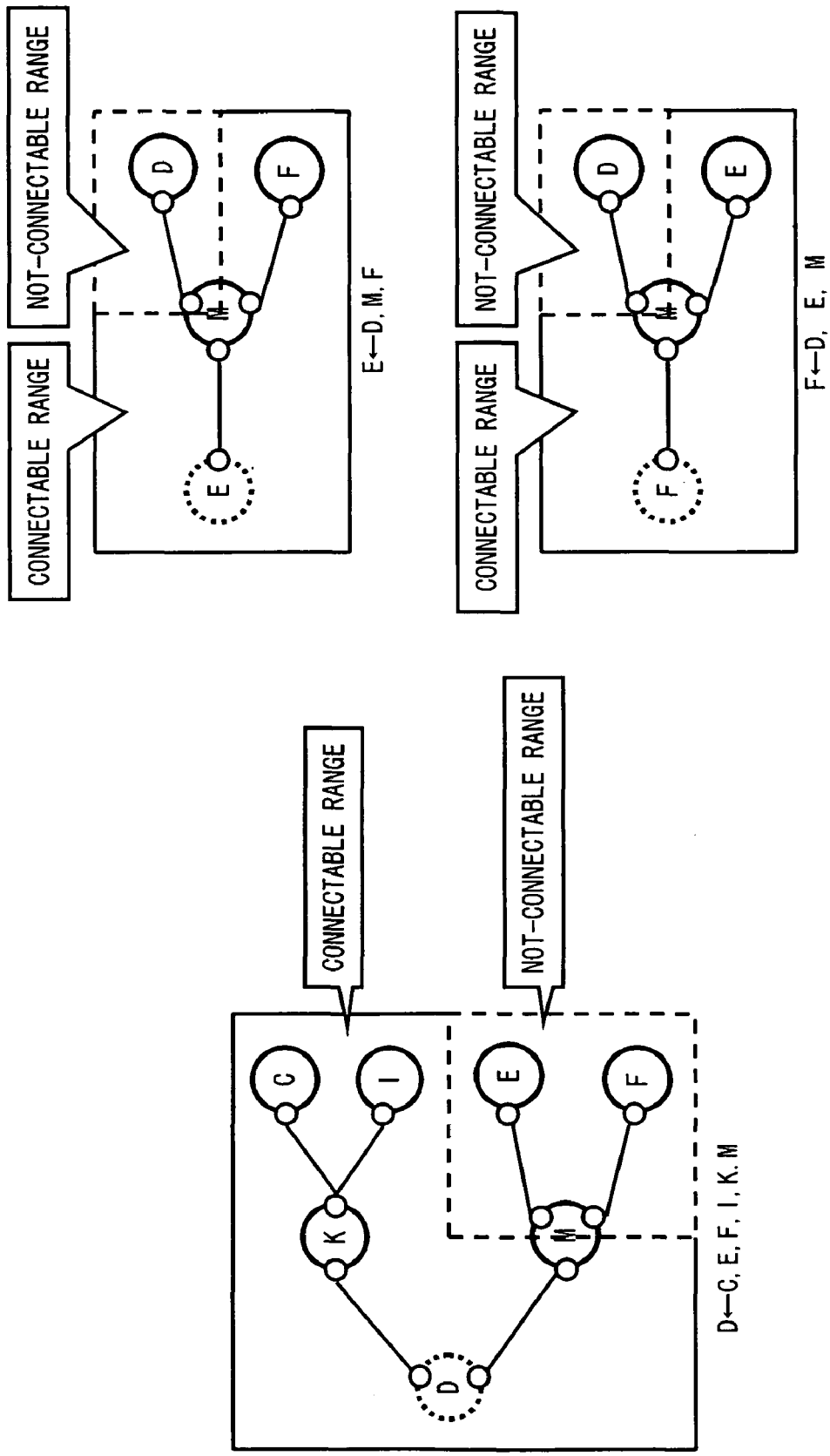
FIG. 22 shows a first set of tree diagrams of a communication availability matrix on the MAC layer.

In this event, a creation of tree diagrams for indicating the connectable and not-connectable ranges for only the changed destinations D, E and F gains the result as shown by FIG. 22. Furthermore, merging the tree diagrams of the destinations E and F eventually gains the tree diagrams as shown by FIG. 23.

The fault management apparatus creates an affected range 1 and an affected range 2 as shown by FIG. 24 from the two tree diagrams and deduces that connectors 321 and 322 sandwiching the fault border point on the border between the affected ranges as the fault occurrence point. Here, since one node only is connected with the connectors 321 and 322, respectively, the judgment is that the fault has occurred on this layer. Then, the search continues on the lower layer, that is, the physical layer where the similar processing is performed.

Figure 25:
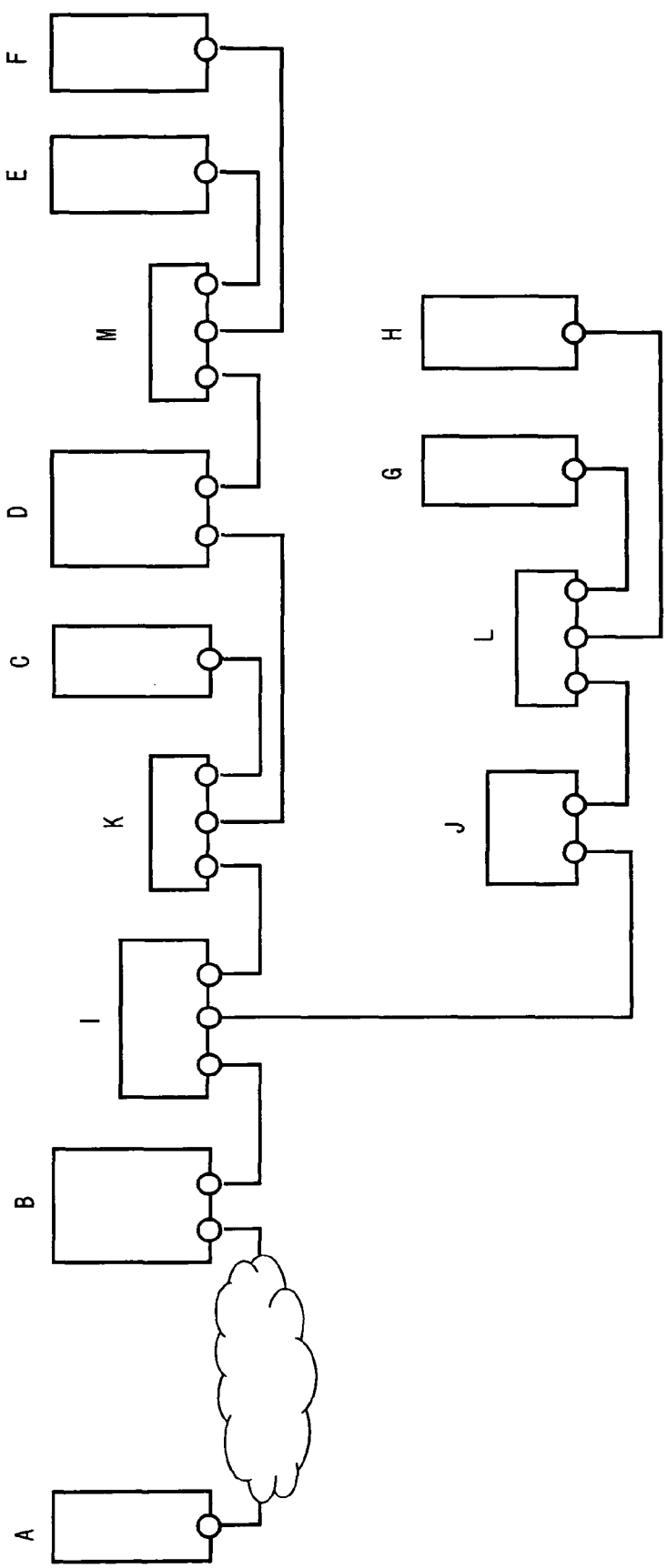
FIG. 25 shows a topology of a physical layer.

The next description is about a method for deducing the fault occurrence point on the physical layer while referring to FIGS. 25 and 26.

FIG. 25 shows the topology of the physical layer of the network shown by FIG. 2; and FIG. 26 shows a communication availability matrix on the physical layer. In this case, the matrix is the same between the normal and faulty conditions, realizing that no fault is recognized on this layer.

Figure 27:
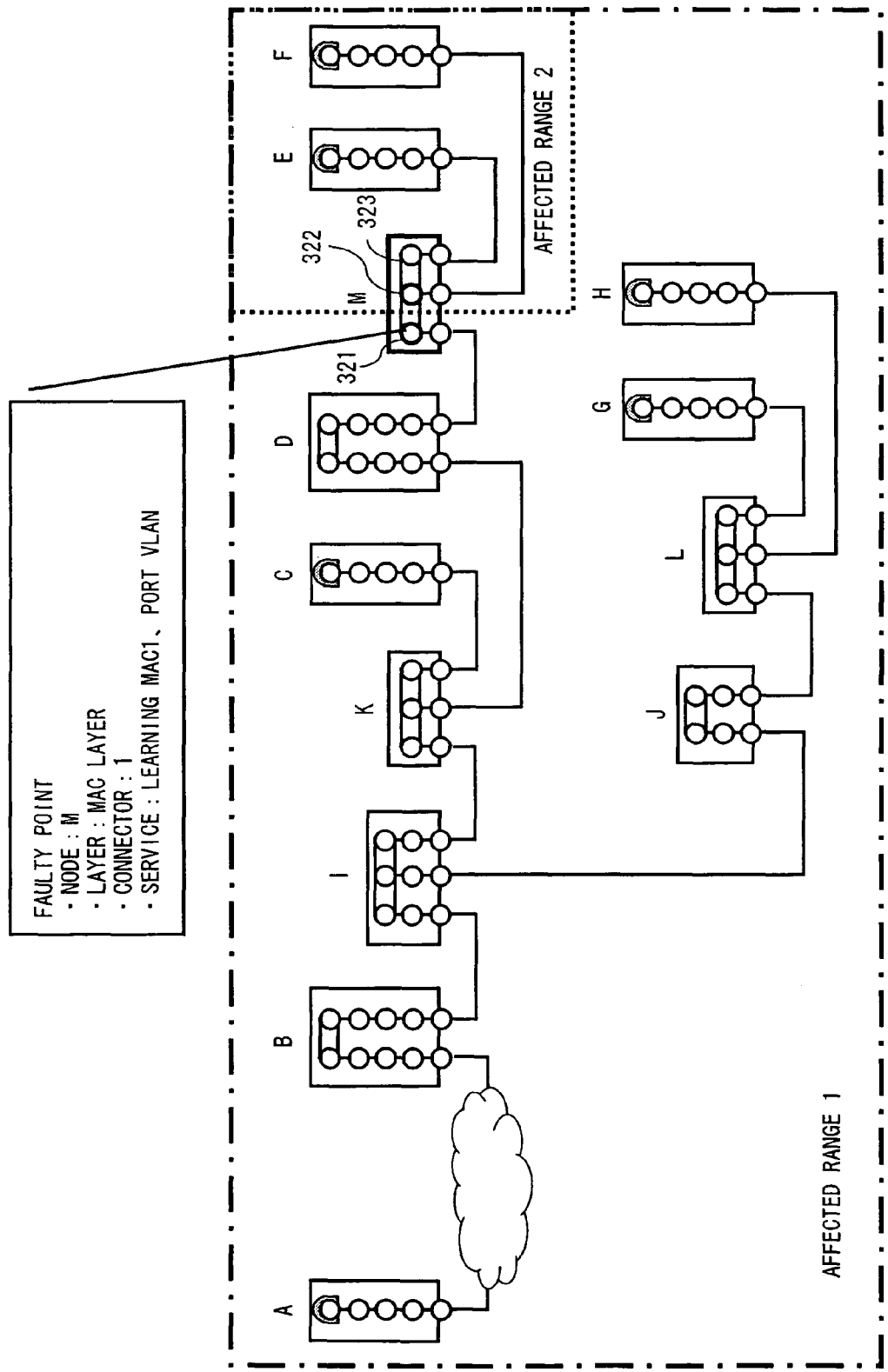
FIG. 27 shows affected ranges of fault on the physical layer.

The fault management apparatus displays the affected ranges and occurrence point of the fault on each layer collectively on the screen as shown by FIG. 27. In an actual case, which of the two connectors sandwiching the border point of the fault on the MAC layer is the fault occurrence point is identified from the information about the communication availability and a service identifier. Here, the node M (i.e., switch) located on the border between the affected ranges 1 and 2 is identified as the fault occurrence device, and the following items of information will be put forth as the fault occurrence point:

Node: M
Layer: MAC layer
Connector: 1 (connector 321)
Service: Learning MAC 1, port VLAN The user is now able to work on a restoration by correcting the VLAN setup of the node M, et cetera, according to the displayed affected ranges and occurrence point.

As described above, a display of the affected ranges and occurrence point of the fault in correspondence with the hierarchical structure of the communication function on the screen enables the user of fault management apparatus to work on the restoration quickly and suitably, also helping to cope with a shortage of skilled network managers. Meanwhile, the fault management apparatus can also be applied to an autonomous control of restoration work, and further applied to sending a notification of information including a faulty condition and available services to the user of a device such as a client computer and server on a network.

Figure 28:
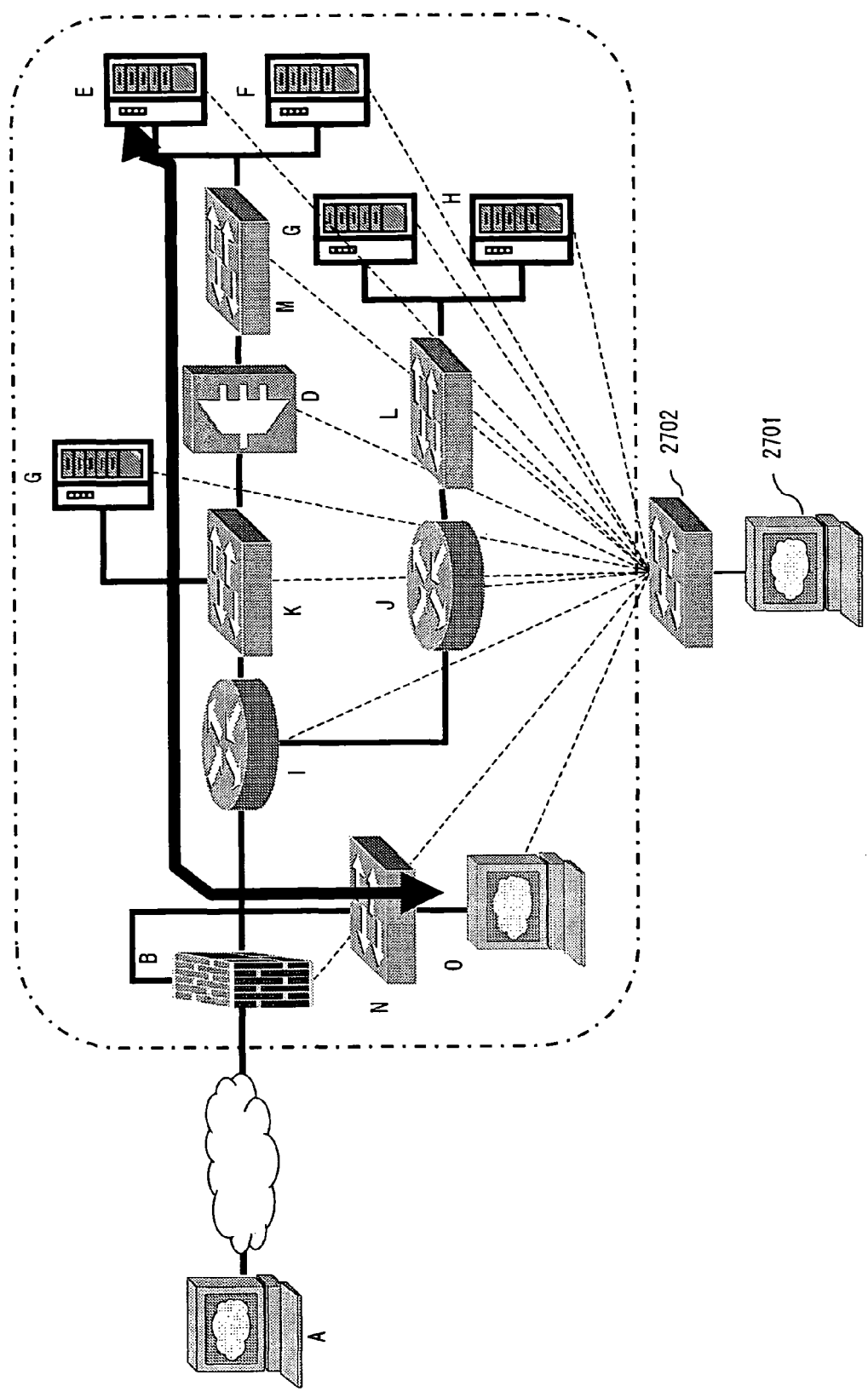
FIG. 28 shows a first fault management apparatus.
Figure 29:
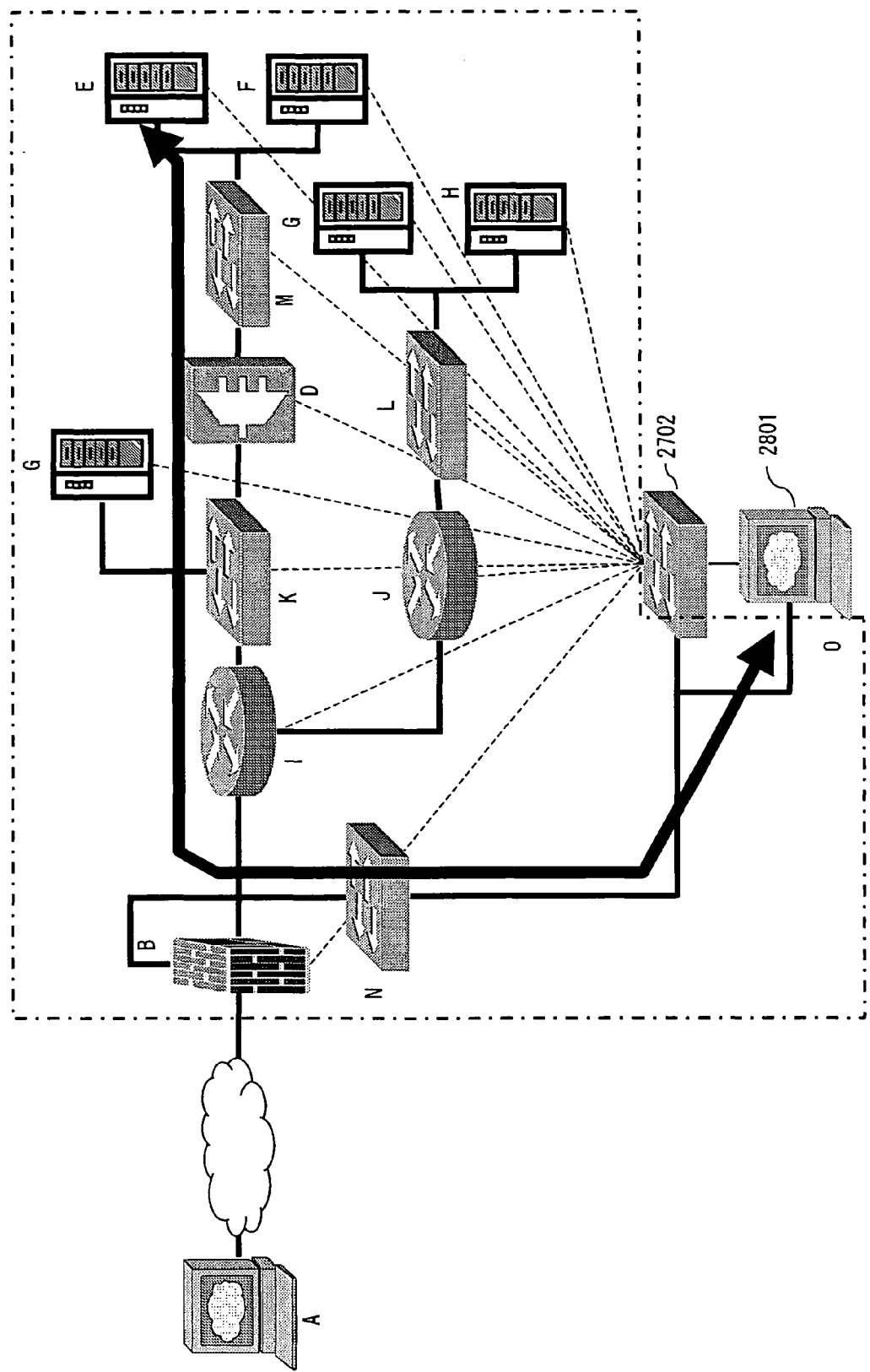
FIG. 29 shows a second fault management apparatus.
Figure 30:
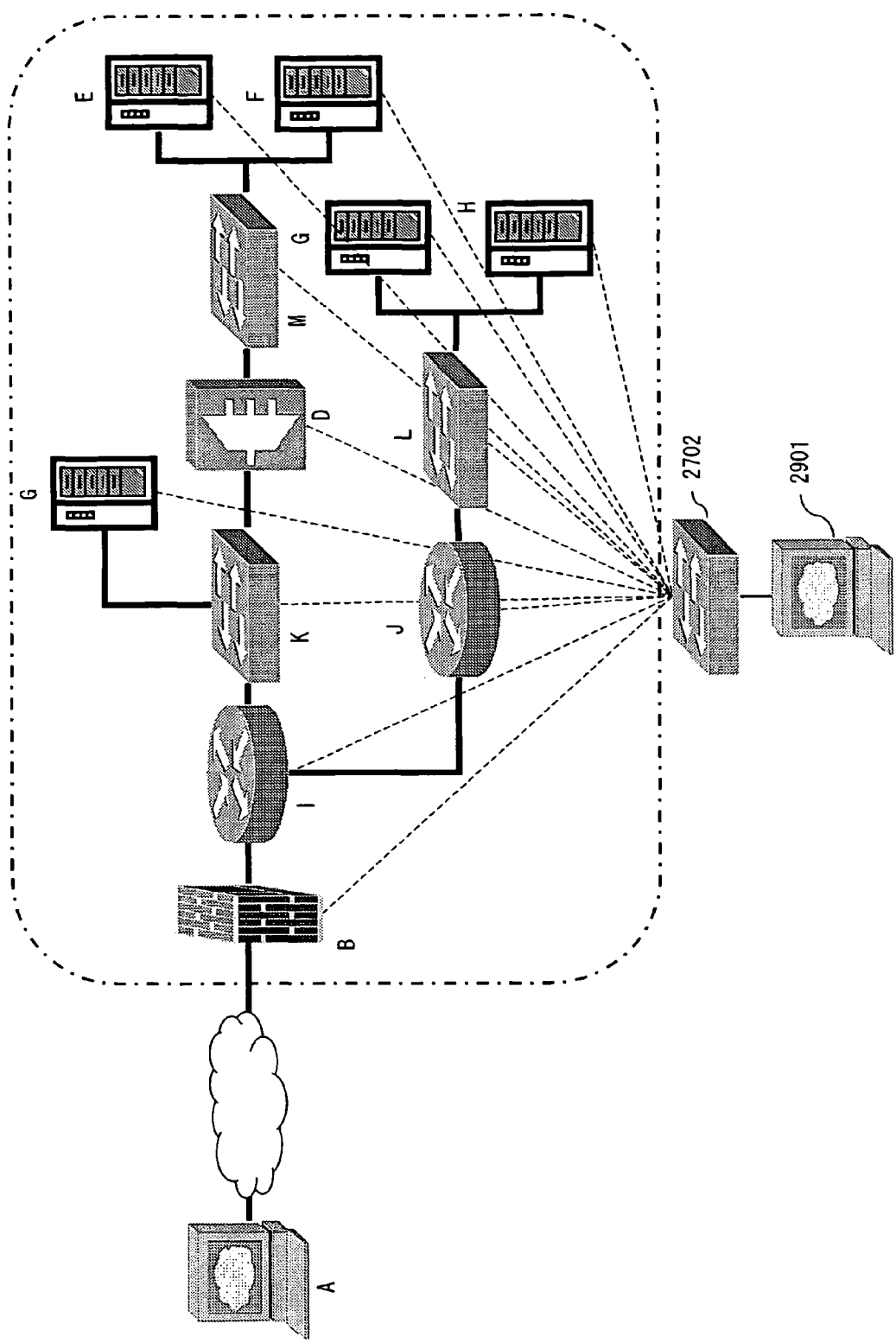
FIG. 30 shows a third fault management apparatus.

The next description is about an example allocation of fault management apparatus in reference to FIGS. 28 through 30.

FIG. 28 shows a configuration with installation of a dummy client and a fault management apparatus. In this configuration, a dummy client computer O is connected with a firewall B by way of a switch N. In this case, the firewall B applies the same policy rule to the communication from the client computer A to the router I, and that from the dummy client computer O to the router I so that there is no connecting relationship between the client computer A and the dummy client computer O in order to ensure the security.

The fault management apparatus 2701 is connected with a network of operations management system by way of a switch 2702 so as to obtain information from the respective devices by way of the network. The fault management apparatus 2701 detects an occurrence of fault by trying a communication between the dummy client computer O and an arbitrary destination by using the application (i.e., service) selected by the user and by monitoring the result.

FIG. 29 shows a configuration with a fault management apparatus being installed by the function of dummy client computer O shown by FIG. 28. In this configuration, the fault management apparatus 2801 is connected with a network of operations management system by way of a switch 2702 and additionally with the firewall B by way of a switch N, thus having the role of the dummy client computer O as well.

FIG. 30 shows a configuration where there is no dummy client computer. In this configuration, the fault management apparatus 2901 is connected with a network of operations management system by way of a switch 2702, executes a periodical topology search and detects a fault occurrence by judging whether or not the data communication is possible between the client computer A and an arbitrary destination for the service selected by the user.

The next description is about a data structure used by the fault management apparatus in reference to FIGS. 31 through 36.

FIG. 31 shows a data structure of node information used for fault monitoring. The node information is the setup information of each device constituting the network as a management target and is obtained from each device.

The node information includes the attribute information and layer information of each node, with the attribute information containing a node identifier and a for-management IP address, and the layer information containing information about the physical, MAC, IP, TCP/UDP and application layers, with information about each layer containing information about connecters and services.

Figure 32:
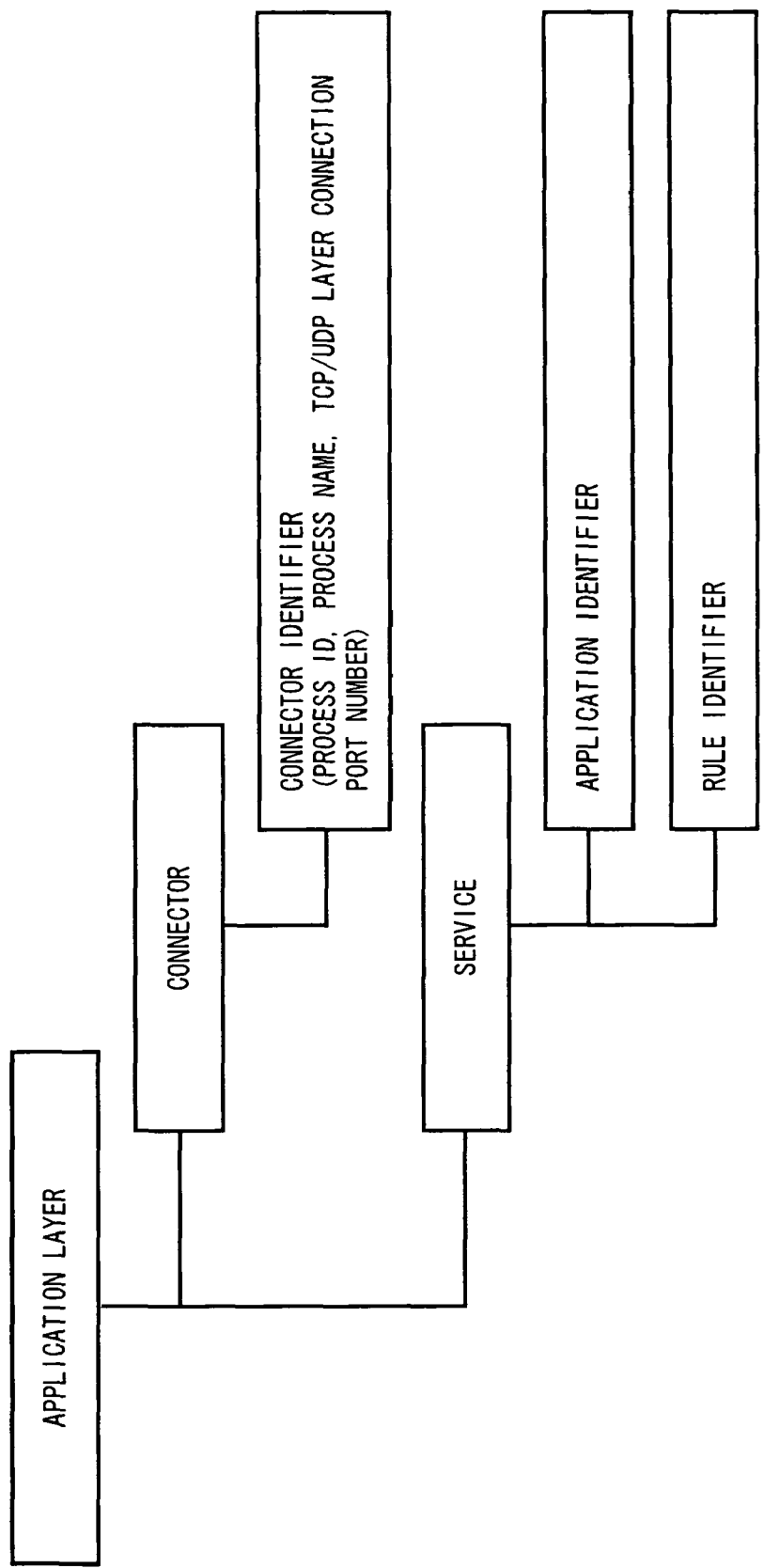
FIG. 32 shows a data structure of an application layer.

FIG. 32 shows a data structure of the application layer shown by FIG. 31. The connector information of this layer includes a connector identifier (i.e. process ID, process name, TCP/UDP layer connection port number), and the information about the service includes an application identifier and a rule identifier.

Figure 33:
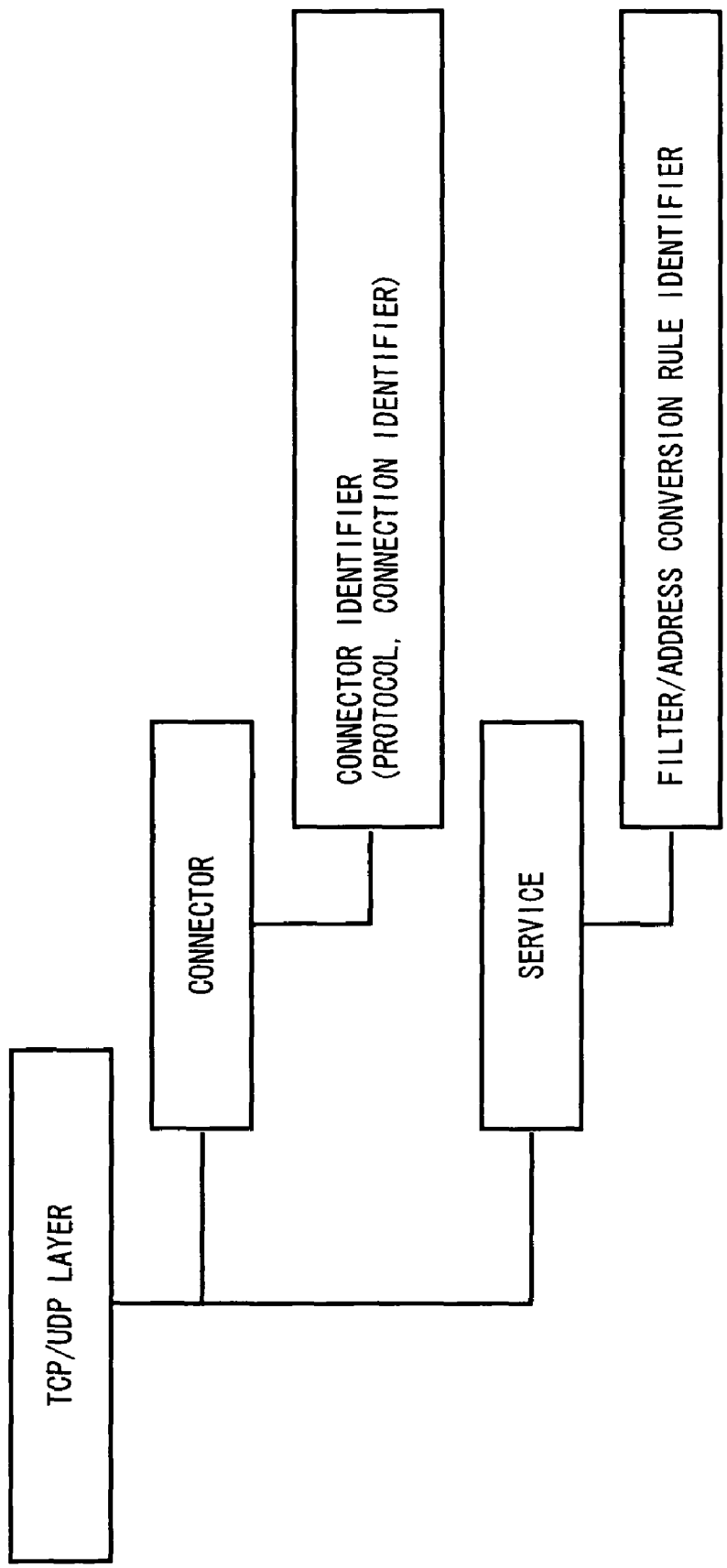
FIG. 33 shows a data structure of a TCP/UDP layer.

FIG. 33 shows a data structure of the TCP/UDP layer shown by FIG. 33. The connector information of this layer includes a connector identifier (i.e. protocol, connection identifier), and the information about the service includes a filter/address conversion rule identifier.

Figure 34:
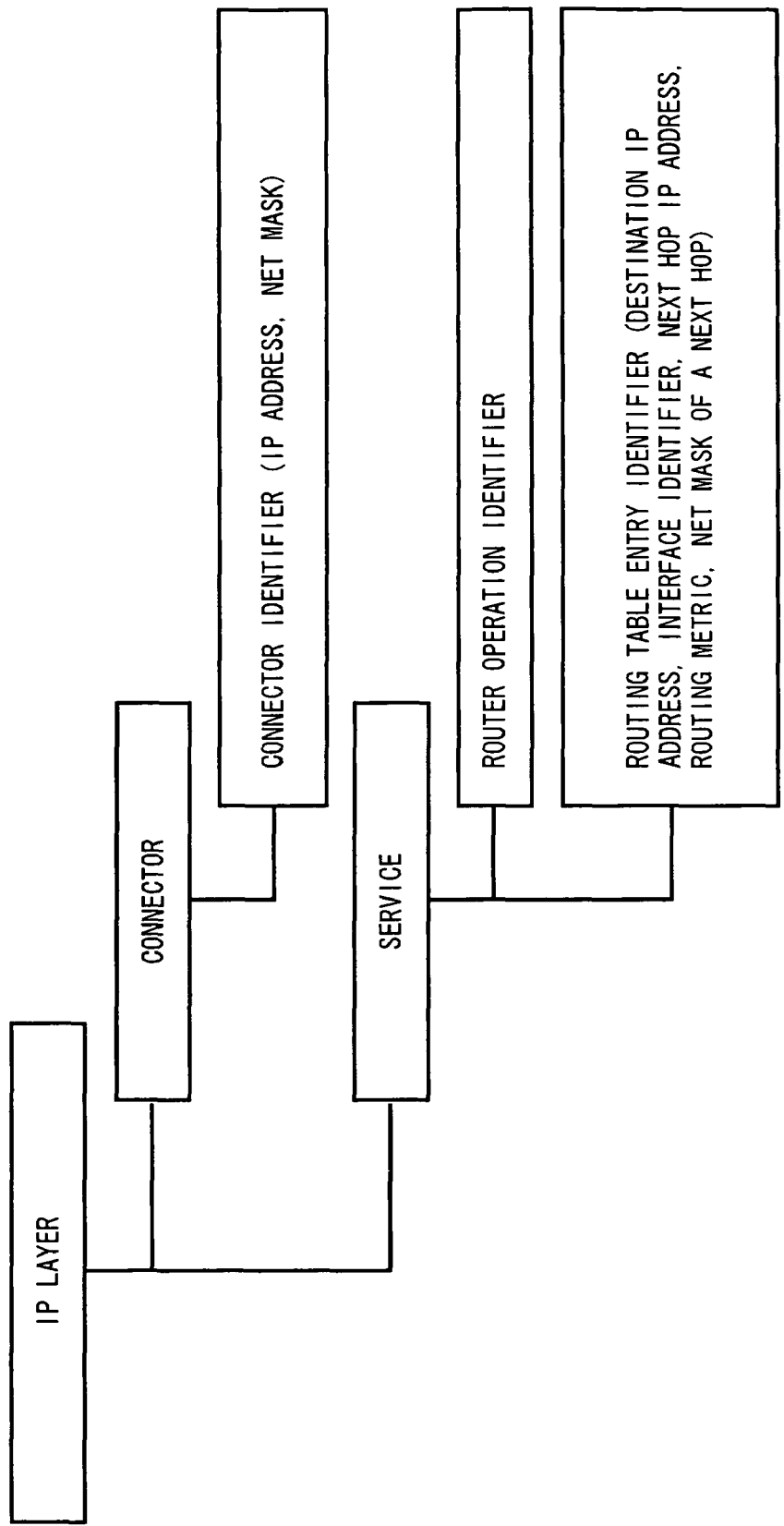
FIG. 34 shows a data structure of an IP layer.

FIG. 34 shows a data structure of the IP layer shown by FIG. 31. The connector information of this layer includes a connector identifier (i.e. IP address, net mask), and the information about the service includes a router operation identifier and a routing table entry identifier (i.e., destination IP address, interface identifier, IP address of a next hop, routing metric, net mask of a next hop).

Figure 35:
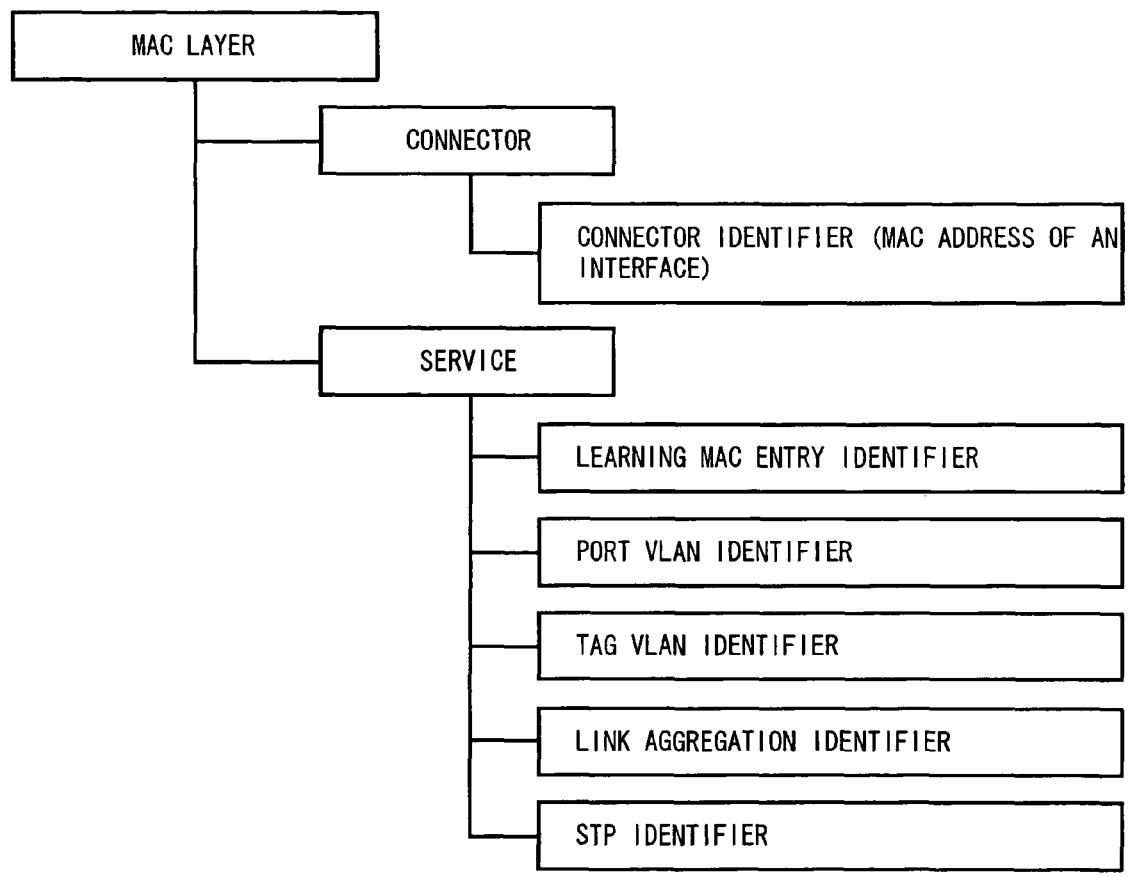
FIG. 35 shows a data structure of a MAC layer.

FIG. 35 shows a data structure of the MAC layer shown by FIG. 31. The connector information of this layer includes a connector identifier (i.e. MAC address of an interface), and the information about the service includes a learning MAC entry identifier, a port VLAN identifier, a tag VLAN identifier, a link aggregation identifier and an STP (Spanning Tree Protocol) identifier.

FIG. 36 shows a data structure of the physical layer shown by FIG. 31. The connector information of this layer includes a connector identifier.

The next is a description about a fault monitoring processing by using the above described node information while referring to FIGS. 37 through 43.

The fault management apparatus creates a communication availability matrix for the normal state by obtaining the topology information from each device operating a service in the network as a management target in the normal state; and also creates a communication availability matrix at a failure state for the same network likewise by obtaining the topology information after a fault occurrence. And the fault management apparatus compares the communication availability matrices between the normal and failure states to detect an occurrence of fault.

Figure 37:
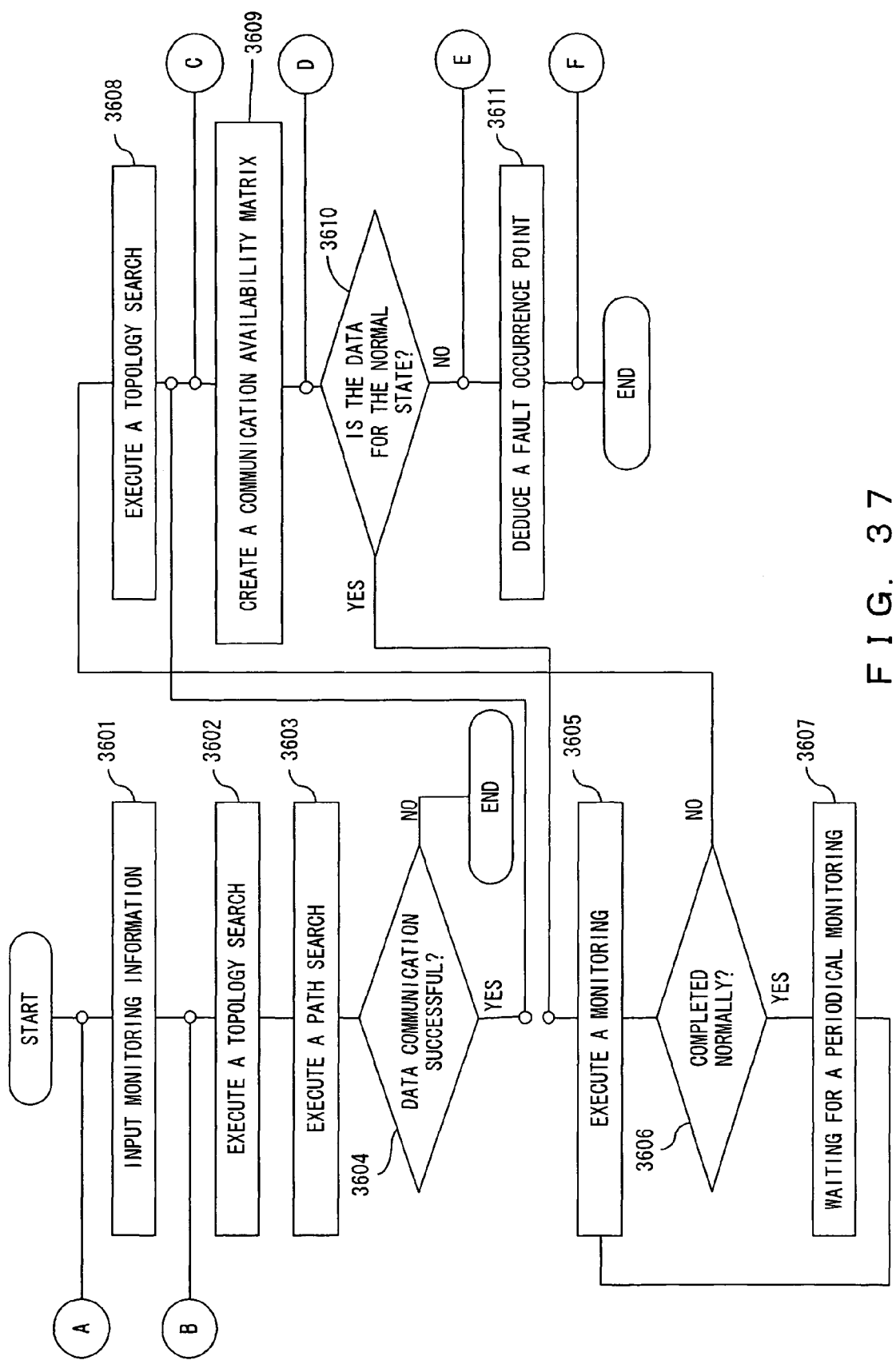
FIG. 37 is a flow chart of a first fault monitoring process.

FIG. 37 is a flowchart of a fault monitoring process in the case of using the function of the dummy client computer O in either of the configurations shown by FIG. 28 or 29. As the user inputs monitoring information in the fault management apparatus (step 3601), the fault management apparatus executes a topology search in the network (step 3602) to create topology information containing the above described node information and store it therein.

Then, the fault management apparatus executes a path search between the dummy client computer O and the destination specified by the monitoring information by using the obtained topology (step 3603) to judge whether or not the data communication is possible between these two points (step 3604), in which a simulation for data communication only is done, not an actual data communication. If the data communication is impossible, the processing ends.

If the above described data communication is possible, the fault management apparatus creates a communication availability matrix (step 3609) and checks whether or not it is the data for the normal state (step 3610) and, if the communication availability matrix is the data for the normal state, tries to actually communicate between the dummy client computer O and the specified destination (step 3605) to check whether or not the dummy client computer O responds back with a "normal completion" (step 3606).

In the case of receiving a response of the normal completion, waits for a certain time to pass for a periodical monitoring (step 3607) to repeat the processings for the step 3605 and thereafter. If not having received a response of "normal completion", executes another topology search (step 3608) and repeats the processings for the steps 3609 and thereafter.

If the communication availability matrix is different from the one for the normal state in the step 3610, the judgment is that there is a fault occurring, prompting to perform a fault occurrence point deduction process (step 3611).

Details of the topology search process in the steps 3602 and 3608, and of the path search process in the step 3603, will be described later.

Figure 38:
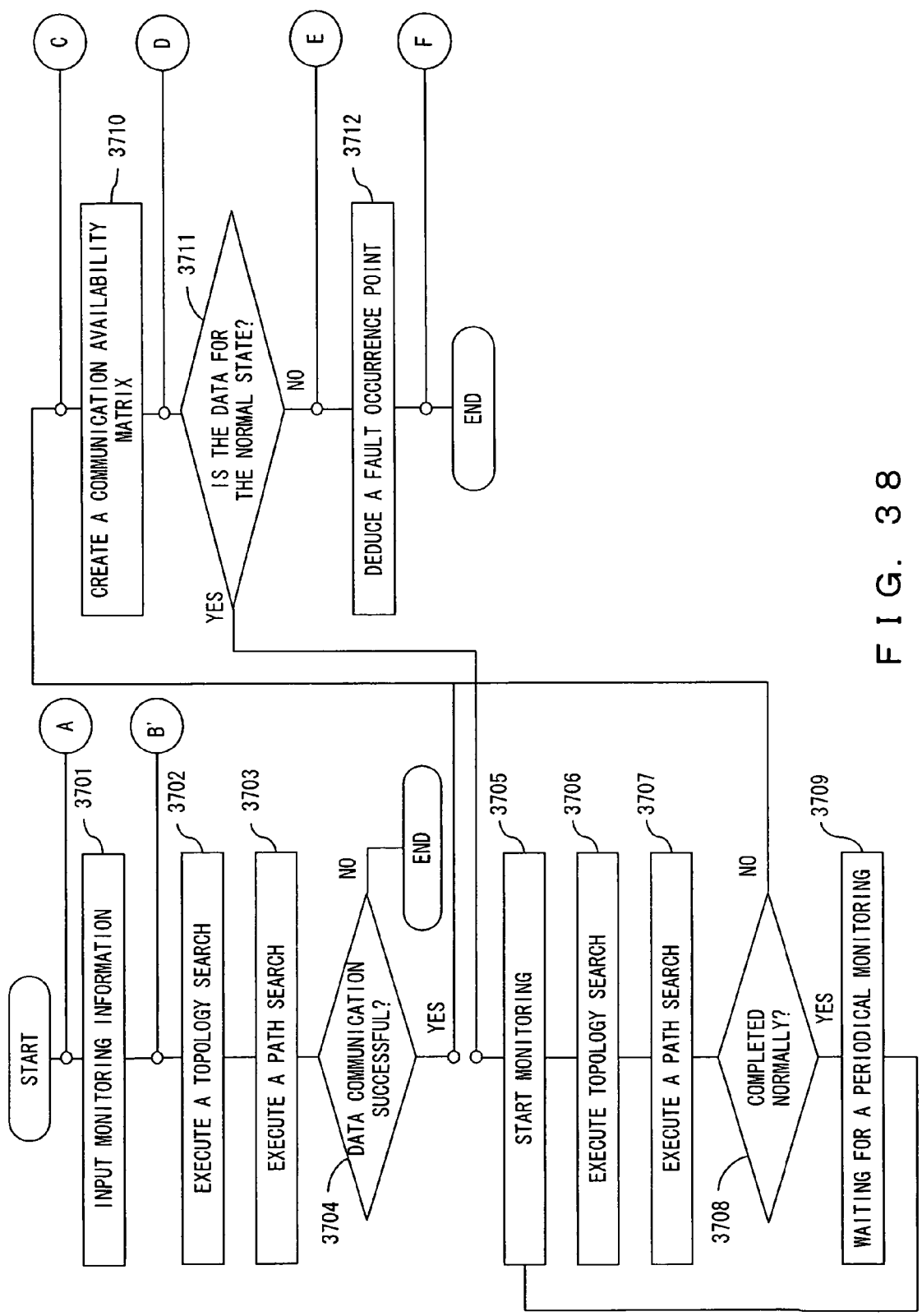
FIG. 38 is a flowchart of a second fault monitoring process.

FIG. 38 is a flowchart of a fault monitoring process for the configuration shown by FIG. 30. As the user inputs monitoring information in the fault management apparatus (step 3701), the fault management apparatus executes a topology search (step 3702).

Then, the fault management apparatus executes a path search between the client computer A and the destination specified by the monitoring information by using the obtained topology (step 3703) to judge whether or not the data communication is possible between these two points (step 3704). If the data communication is impossible, the processing ends.

If the above described data communication is possible, the fault management apparatus creates a communication availability matrix (step 3710) and checks whether or not it is the data for the normal state (step 3711) and, if the communication availability matrix is the data for the normal state, starts a fault monitoring (step 3705), and executes a topology search (step 3706), followed by executing a path search as in the step 3702 (step 3707) to judge whether or not the data communication is possible (step 3708).

If the data communication is possible, waits for a certain time period (step 3709) and repeats the processings for the step 3705 and thereafter. If the data communication is impossible, proceeds to the processings for the steps 3710 and thereafter.

If the communication availability matrix is different from the one for the normal state in the step 3711, the judgment is that there is a fault occurring, prompting to perform a fault occurrence point deduction process (step 3712).

Figure 39:
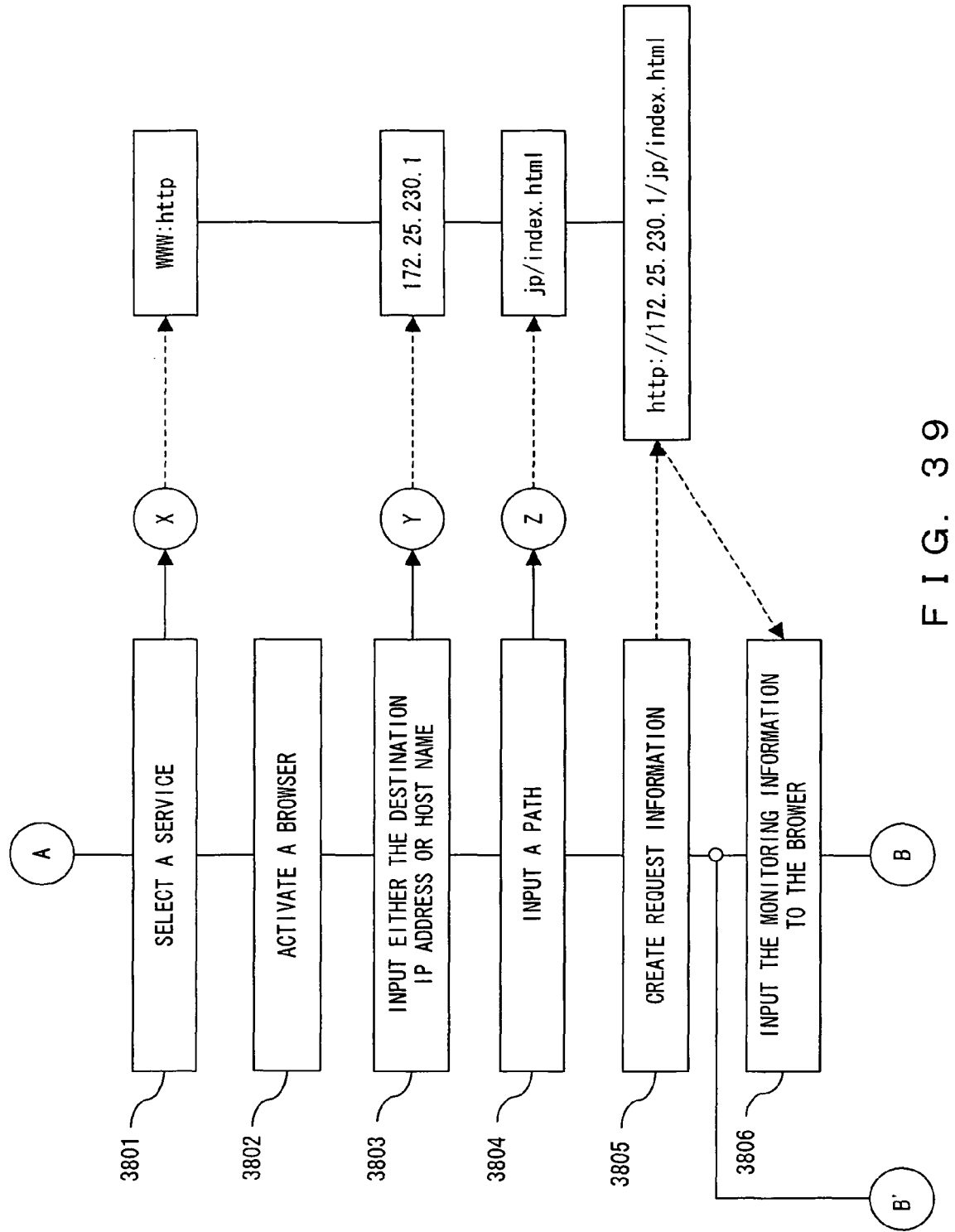
FIG. 39 is a flowchart of a monitoring information input process.

FIG. 39 is a flowchart of a monitoring information input process for the step 3601 shown by FIG. 37 and the step 3701 shown by FIG. 38. First, the user selects a service for use in a communication (step 3801), activates a browser installed in the dummy client computer O (step 3802), inputs either a destination IP address or host name as the monitoring target (step 3803) and inputs a path (step 3804).

The fault management apparatus creates request information (step 3805) and inputs the request information to the activated browser as the monitoring information (step 3806), except that the step 3701 shown by FIG. 38 skips the processing of the step 3806.

Incidentally, the created request information will be used for the path search in the step 3603 shown by FIG. 37, and the steps 3703 and 3707 shown by FIG. 38.

For example, if a web service (WWW:http) is selected, a destination IP address, "172.25.230.1" and a path "jp/index.html" are inputted, then the request information such as "http://172.25.230.1/jp/index.html" will be created.

Figure 40:
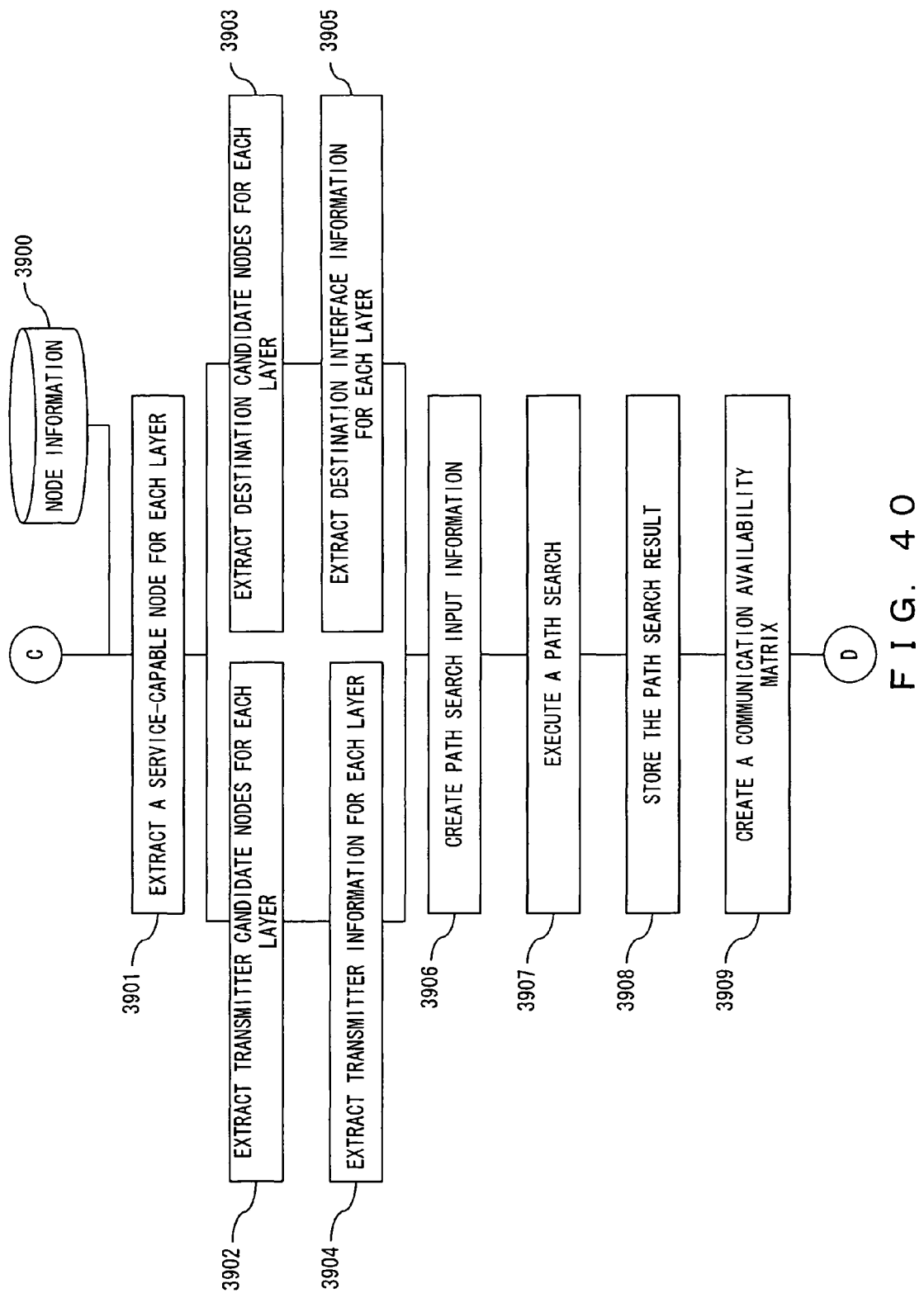
FIG. 40 is a flow chart of a communication availability matrix generation process.

FIG. 40 is a flow chart of communication availability matrix creation process in the step 3609 shown by FIG. 37 and the step 3710 shown by FIG. 38. The fault management apparatus first extracts a service-capable node for each layer from the node information 3900 which has a data structure shown by FIG. 31 (step 3901), extracts a transmitter candidate node for each layer (step 3902) and extracts an destination candidate node (step 3903).

Figure 41:
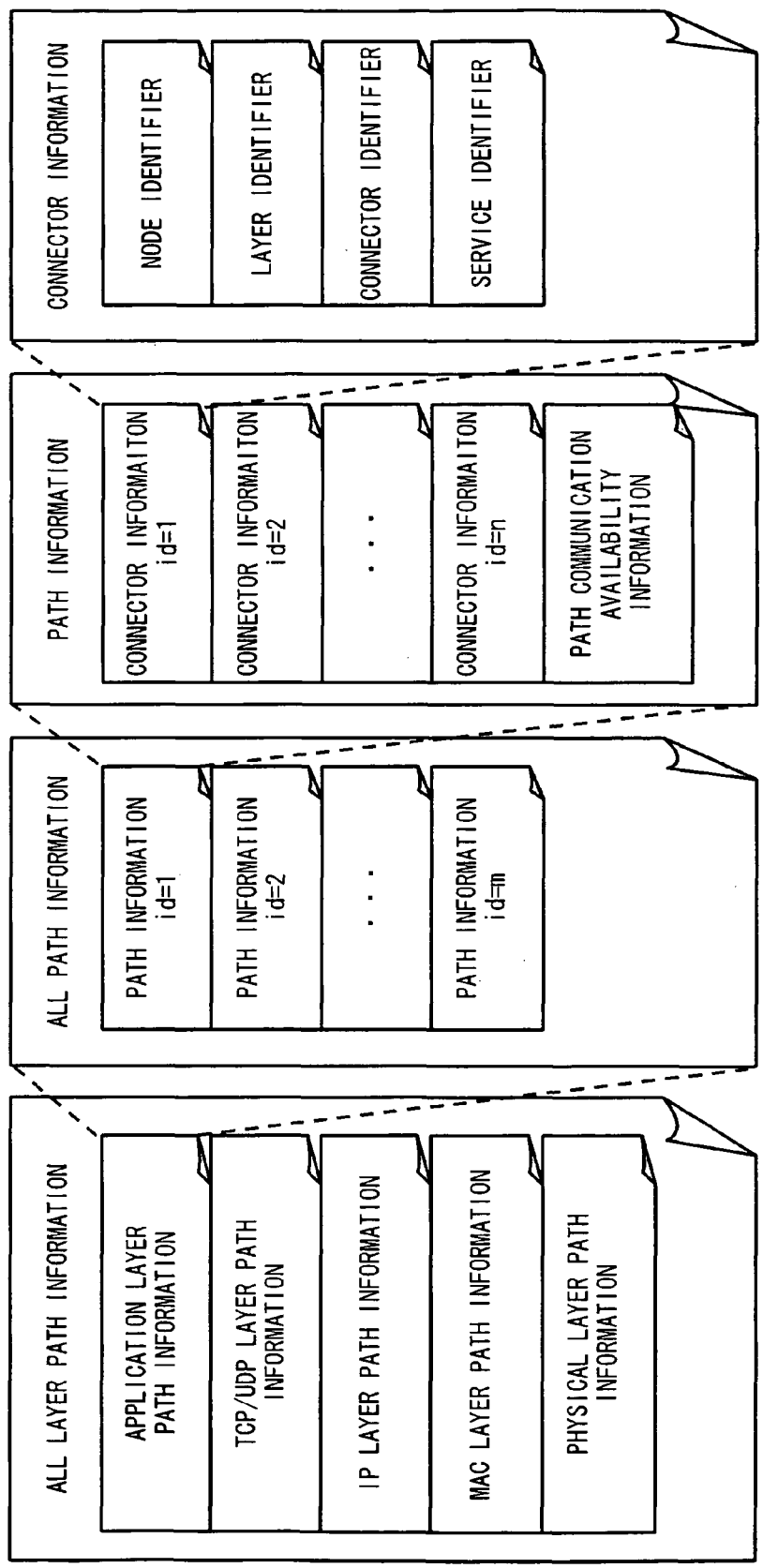
FIG. 41 shows a result of a path search.

The fault management apparatus further extracts transmitter interface information for each layer (step 3904) and destination interface information for each layer (step 3905). The nodes and the interface information are extracted in the steps 3902 through 3904 as follows.

a. Service-Capable Node (Step 3901)
(1) Application Layer
Nodes whose data exist in the application layer of the node information 3900
(2) TCP/UDP Layer
Nodes whose data exist in the TCP/UDP layer of the node information 3900
(3) IP Layer
Nodes whose data exist in the IP layer of the node information 3900
(4) MAC Layer
Nodes whose data exist in the MAC layer of the node information 3900
(5) Physical Layer
Nodes whose data exist in the physical layer of the node information 3900 b. Transmitter Candidate Node (Step 3902)
(1) Application Layer
All nodes, or the nodes in which the client process of a selected application is activated
(2) TCP/UDP Layer
All nodes
(3) IP Layer
Nodes with an IP address
(4) MAC Layer
Nodes with a MAC address
(5) Physical Layer
Nodes with a port number c. Destination Candidate Node (Step 3903)
(1) Application Layer
Nodes in which the server process for the selected application is activated
(2) TCP/UDP Layer
Nodes in which the port for the selected application is activated
(3) IP Layer
Nodes with an IP address
(4) MAC Layer
Nodes with a MAC address
(5) Physical Layer
Nodes with a port number d. Transmitter Interface Information (Step 3904)
(1) Application Layer
All IP addresses for the transmitter candidate node on the application layer
(2) TCP/UDP Layer
All IP addresses for the transmitter candidate nodes on the TCP/UDP layer
(3) IP Layer
All IP addresses for the transmitter candidate nodes on the IP layer
(4) MAC Layer
All MAC addresses for the transmitter candidate nodes on the MAC layer
(5) Physical Layer
All connector identifiers for the transmitter candidate nodes on the physical layer e. Destination Interface Information (Step 3905)
(1) Application Layer
IP addresses for the destination candidate nodes on the application layer
(2) TCP/UDP Layer
IP addresses for the destination candidate nodes on the TCP/UDP layer
(3) IP Layer
All IP addresses for the destination candidate nodes on the IP layer
(4) MAC Layer
All MAC addresses for the destination candidate nodes on the MAC layer
(5) Physical Layer
All connecter identifiers for the destination candidate nodes on the physical layer The fault management apparatus creates path search input information for specifying the combinations of the selected transmitters and destinations for executing a path search for all the combinations (step 3906) and executes the searches (step 3907), for which the service (e.g., http) and path for the application layer, the protocol (e.g., tcp) and address port number for the TCP/UDP layer, et cetera, are used as the path search input information. And then the fault management apparatus stores the result of the path search for each combination as shown by FIG. 41 (step 3908).

The path search result includes the path information of each layer from the application layer through to the physical layer, with the path information of each layer containing the m pieces of path information 1 through m. Each piece of path information includes the n pieces of connector information 1 through n and path communication availability information, with each connector information containing a node, layer, connector and service identifiers. The path communication availability information indicates whether the data communication between the specified transmitter and destination is possible or not.

The fault management apparatus creates a communication availability matrix based on the path communication availability information (step 3909).

Figure 42:
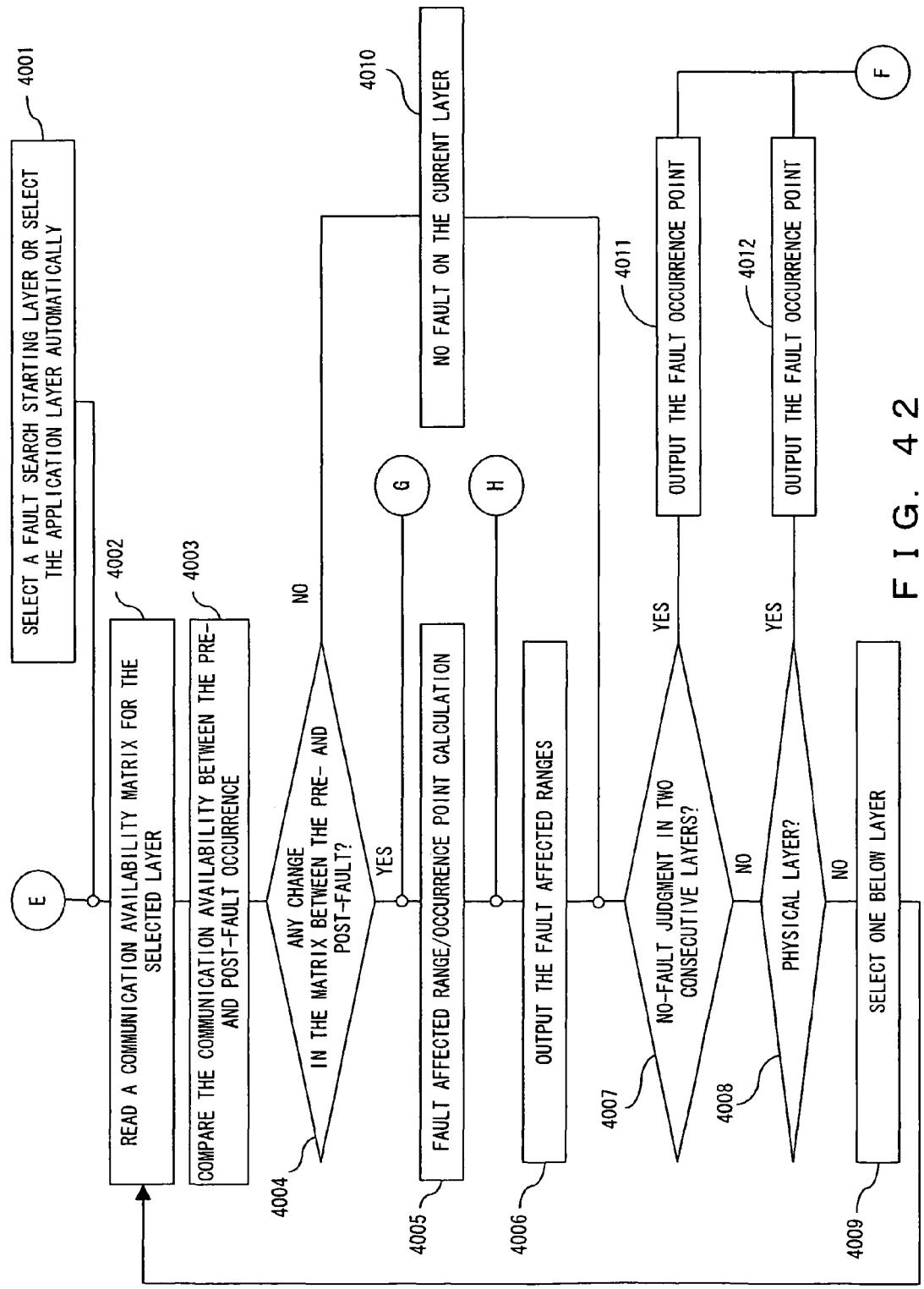
FIG. 42 is a flow chart of a fault occurrence point deduction process.

FIG. 42 is a flow chart of a fault occurrence point deduction process in the step 3611 shown by FIG. 37 and the step 3712 shown by FIG. 38. The fault management apparatus first decides on a fault search starting layer (step 4001) which is usually selected by the user, but an automatic selection of the application layer may be possible.

Then, the fault management apparatus reads the communication availability matrix for the selected layer (step 4002), compares the aforementioned matrices between the pre- and post-fault states (step 4003) and checks whether or not there is a change in the matrices between the pre- and post-fault states (step 4004).

If there is a change in the communication availability matrix, the fault management apparatus performs a fault affected range/occurrence point calculation process (step 4005) and displays the affected ranges by the fault on the screen (step 4006). If there is no change in the communication availability matrix, the judgment is that there is no fault occurrence on the current layer (step 4010).

Then, the fault management apparatus checks whether or not a no-fault has been judged on the two consecutive layers (step 4007) and, if there is no such judgment, judges whether or not the current layer is the physical layer (step 4008). If the current layer is not the physical layer, then selects the one below layer (step 4009) to repeat the processings for the steps 4002 and thereafter. This will lead to a drilling down across the hierarchical layers.

Then, if a no-fault has been judged on the two consecutive layers in the step 4007, the fault management apparatus displays the fault occurrence point on the layer two layer above on the screen (step 4011) and, if the current layer is the physical layer by the judgment in the step 4008, displays, on the screen, the fault occurrence point on the layer one layer above (step 4012).

Figure 43:
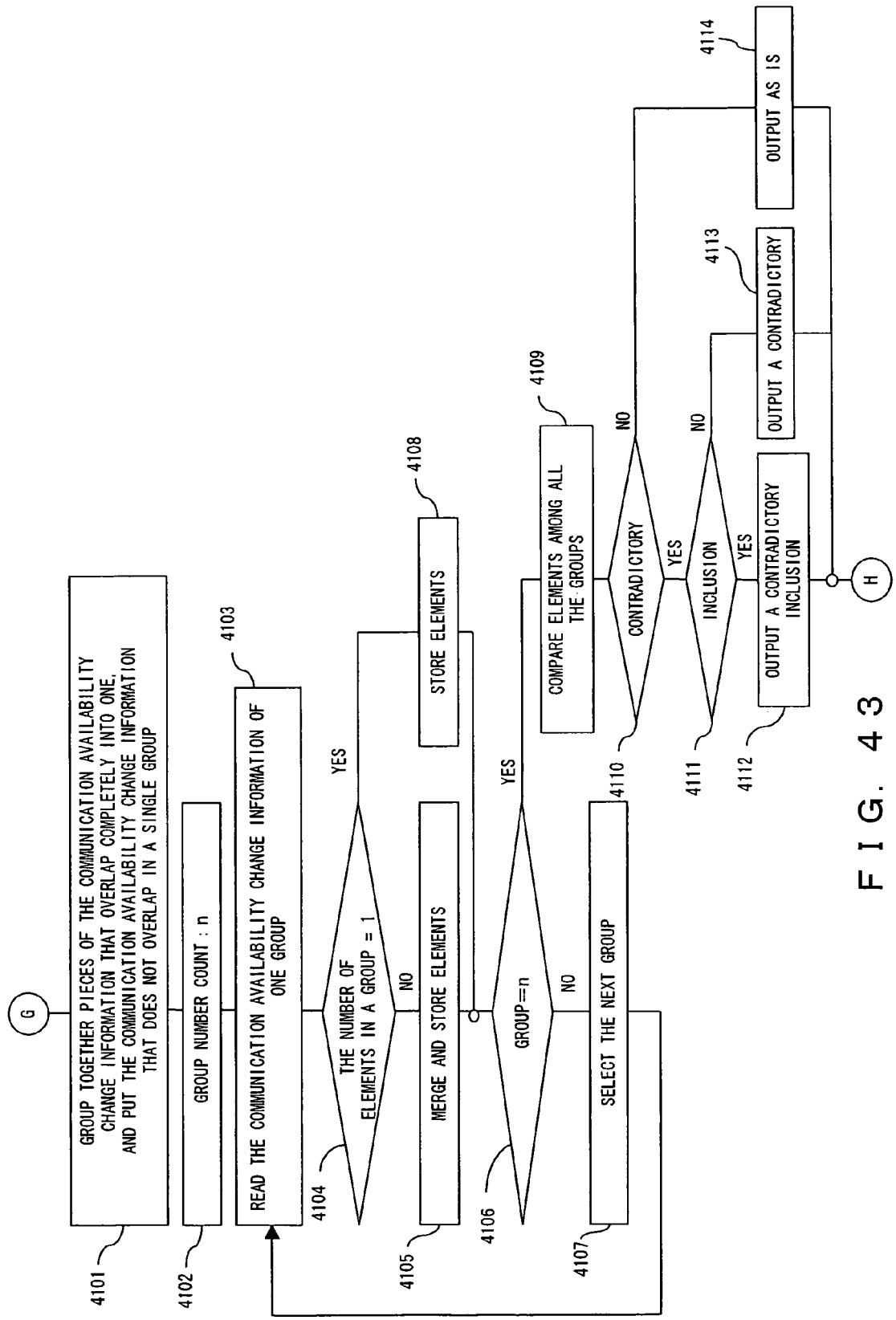
FIG. 43 is a flow chart of a fault affected range/occurrence point calculation process.

FIG. 43 is a flow chart of a fault affected range/occurrence point calculation process in the step 4005 shown by FIG. 42. The fault management apparatus first extracts communication availability change information corresponding to the above described tree diagrams from the communication availability matrix and groups together the pieces of the communication availability change information that overlap completely (step 4101). In the processing, the other communication availability change information that does not overlap with another is grouped singularly (i.e., the number of elements in a group=1).

Here, all elements in the column including the one which has changed from communicable before a fault occurrence to incommunicable after the fault occurrence are extracted, as the communication availability change information, from among the elements in the communication availability matrix at the fault occurrence. In the communication availability matrix shown by FIG. 6 for example, all columns corresponding to the destinations E through H are extracted as the communication availability change information. Meanwhile, the changed elements overlap completely between the columns E and F, and therefore these two are grouped together, and likewise the columns G and H are also grouped together.

Then the fault management apparatus substitutes the number of the formed groups for a group number count n (step 4102), reads the communication availability change information of one group (step 4103) and checks whether or not the number of elements in the group (i.e., the number of pieces of communication availability change information) is 1 (step 4104). If the number of elements in the group is not 1, the fault management apparatus merges and stores those pieces of communication availability change information (step 4105), while if the number of elements in a group is 1, then stores the communication availability change information as is (step 4108).

Then, the fault management apparatus checks whether or not the processings have completed for the n groups (step 4106) and, if there is a group yet to be processed, selects the next group (step 4107) to repeat the processings of the steps 4103 and thereafter; and when finishing the processings for then groups, compares the elements of all the groups stored in the steps 4105 and 4108 (step 4109) to check whether or not pieces of the communication availability change information contradict one another between two groups (step 4110).

If the pieces of the communication availability change information contradict one another between the groups, then the fault management apparatus checks whether or not the pieces of the communication availability change information are in an inclusion relation with one another between the groups (step 4111) and, if there is such a relation, outputs those groups as the affected ranges having a contradictory inclusion relation (step 4112).

On the other hand, if the pieces of communication availability change information does not contradict one another, each group is outputted as an affected range as it is, while if the pieces of communication availability information are not in an inclusion relation by checking in the step 4111, those groups are outputted as the affected ranges having a contradictory relation (step 4113).

In the case of the communication availability matrix shown by FIG. 6 for example, the two groups shown by FIG. 8 are created by merging the pieces of the communication availability change information shown by FIG. 7. Since the connectable range and not-connectable range are mutually exchanged between these groups, they are judged to be in a contradictory relation.

Meanwhile, in the case of the communication availability matrix shown by FIG. 11, the two groups shown by FIG. 13 are created by merging the pieces of the communication availability change information shown by FIG. 12. Since the connectable range and not-connectable range are mutually exchanged between these groups, and the connectable range of the group of destination D includes the not-connectable range of the group of destinations E and F, and therefore the two groups are judged to be in a contradictory inclusion relation.

The processings in the steps 4112 through 4114 create the result of calculating the affected range and occurrence point of the fault in the same format as the path search result shown by FIG. 41. In this case, the calculation result of the affected range is outputted by the data structure of the "affected range information" replacing "path information" and eliminating the "path communication availability information," both shown by FIG. 41. And, the calculation result of the fault occurrence point is outputted by the data structure of the "fault occurrence point information" replacing "path information" and eliminating the "path communication availability information," both shown by FIG. 41.

Incidentally, the topology search process and the path search process shown by FIGS. 37, 38 and 40 are performed by the "topology search technology" and "path search technology" described in the prior Japan patent application No. 2004-164778. Accordingly, the gist of the "topology search technology" and "path search technology" will be described while referring to FIGS. 44 through 48 as follows:

(1) Topology Search Technology

The present technology is for enabling a system to comprehend a network topology across all layers by collecting and analyzing information relating to each layer from each network device by using an SNMP-MIB (management information base), et cetera, based on a model which expresses a topology integrating all layers across from the physical to application layers and render and display the network topology as a map. The technology makes it possible to grasp a topology of all layers easily, which had been difficult conventionally.

Figure 44:
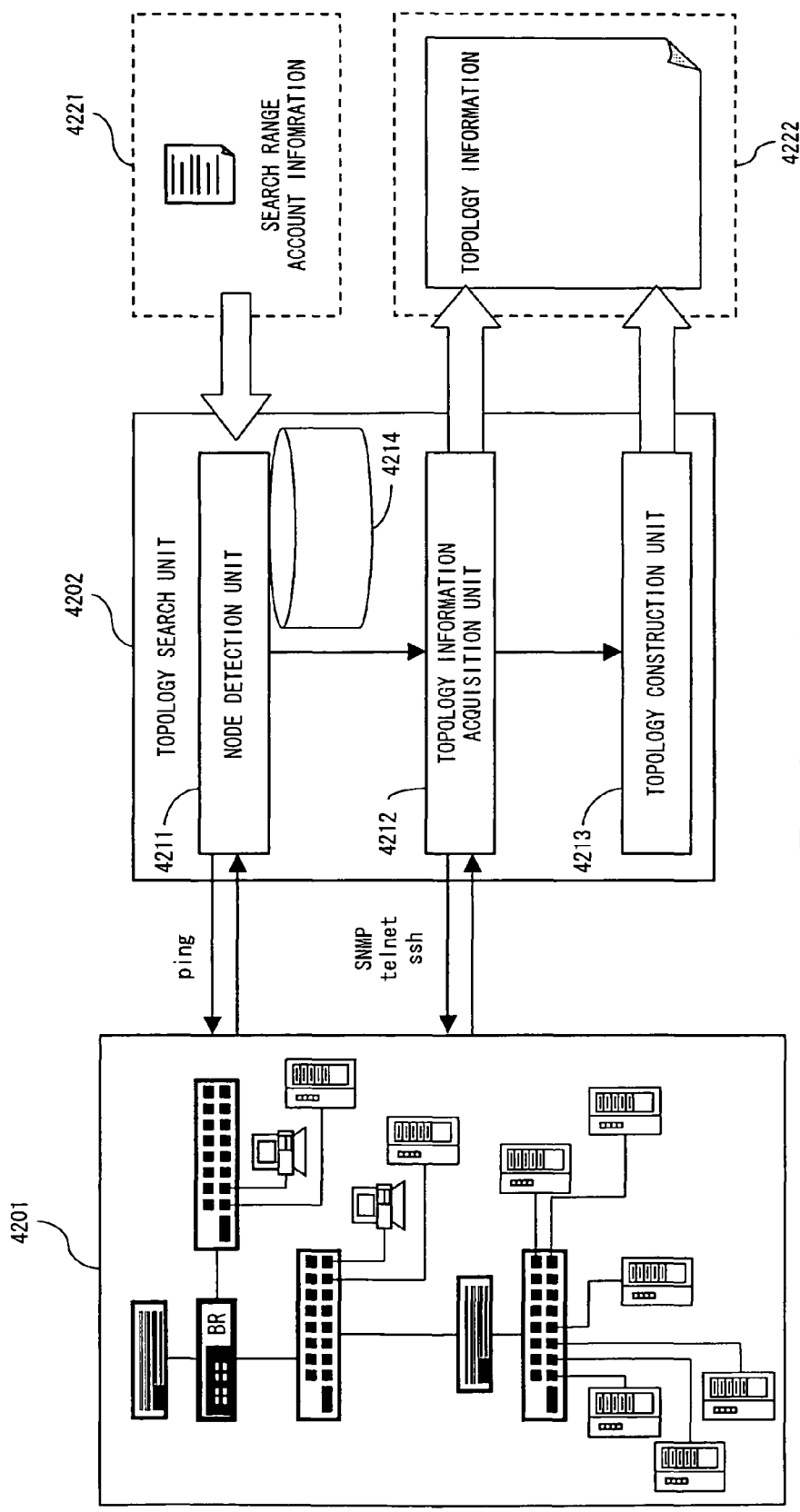
FIG. 44 shows a configuration of a topology search unit.

FIG. 44 shows a configuration of a topology search unit where the topology search technology is implemented. The topology search unit 4202 shown by FIG. 44, comprising a node detection unit 4211, a topology information acquisition unit 4212 and a topology construction unit 4213; figures out a physical and logical connections among devices constituting a network as the management target in the following procedure.

1. The node detection unit 4211 receives input information 4221 containing a range of IP addresses for the management target network 4201 (i.e., search range) and the account information of each device, and tries a search by using ping for the search range in order to detect devices (i.e., nodes) constituting the network 4201 and create a list of the detected nodes 4214.

2. The topology information acquisition unit 4212 acquires information of settings and services of the detected network devices by using the SNMP, telnet or ssh (secure shell), while obtaining the account information of each device necessary for acquiring the information from the node detection unit 4211.

3. The topology construction unit 4213 figures out the physical and logical connection relationship among the devices based on the acquired information to output topology information 4222 by formats which can be used for various purposes. The topology information 4222 contains node information and link information. The node information is the setup information of the devices constituting the network 4201, and the link information is the information about the physical and logical connections among the devices.

FIG. 45 shows an example of device setup information acquired by the topology information acquisition unit 4212. The setup information, showing the device setup information of a personal computer, includes a node name (i.e., node identifier), a device type, an interface and a routing table. The node name is the identifier information of the device, the device type is the information for showing the category of the device, the interface is the information about the communication interface installed in the device, and the routing table is the information about the path for use in communication used by each interface.

The personal computer is equipped with one interface whose information includes the number, name, MAC address and IP address. And the routing table registers an destination IP address, the name of transmitting interface, the next path IP address and the priority, for each entry.

The setup information for the other devices are similar to the one for a personal computer. The device setup information for a switch further includes bridging information, VLAN information and link aggregation information; the one for a router further includes routing information; the one for a firewall further includes packet filtering information; and the one for a server further includes application information.

The topology construction unit 4213 generates a physical connection relationship between the devices by acquiring the MAC learning table of each device and collating the contents of the MAC learning tables of respective devices. The MAC learning table records the correspondence relationship between a destination MAC address and a transmitter port.

Figure 46:
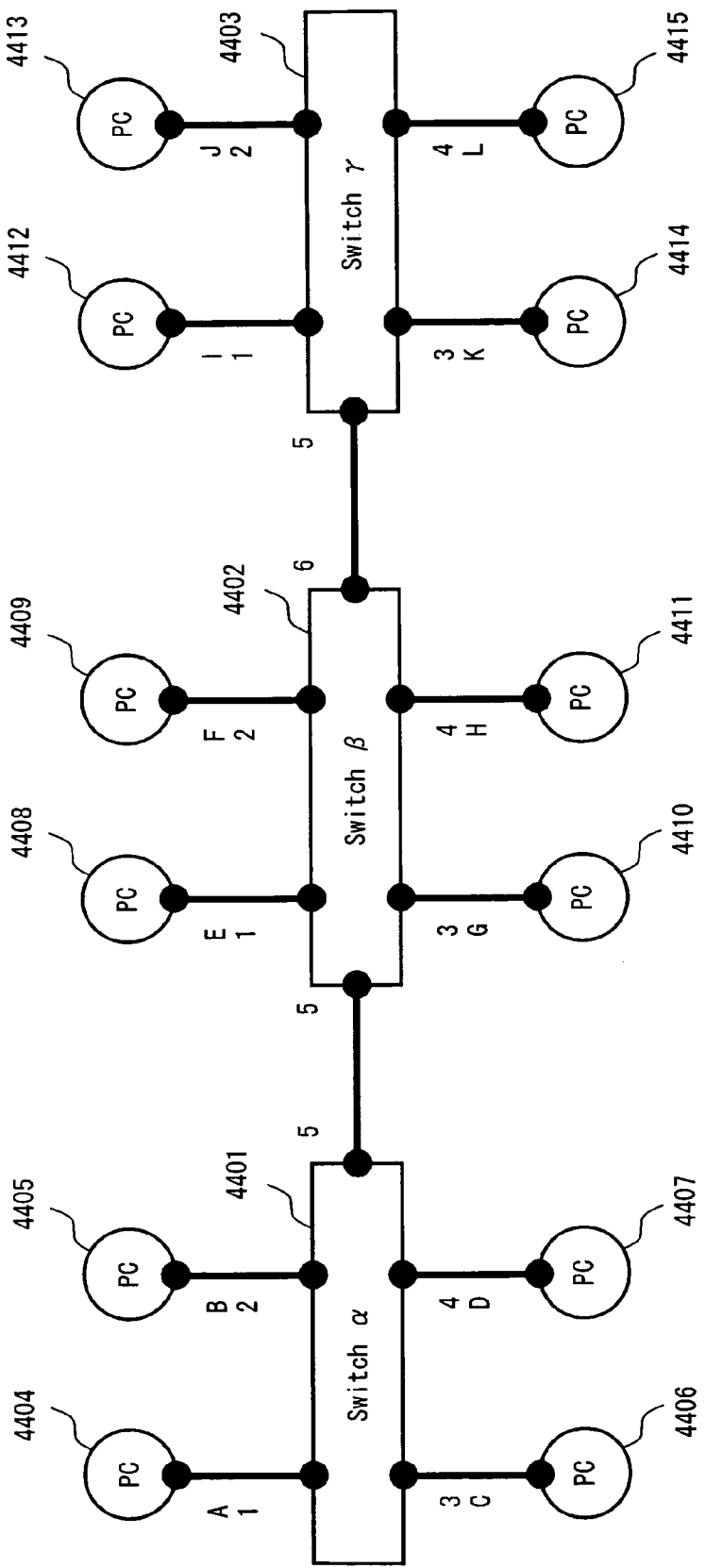
FIG. 46 shows physical connections.

FIG. 46 shows an example of physical connections for a network as the management target. The network comprises switches 4401 through 4403 and personal computers ("PC" hereinafter) 4404 through 4415.

The switch 4401 (i.e., switch α) comprises ports 1 through 5, with the ports 1, 2, 3 and 4 being connected to the PCs 4404, 4405, 4406 and 4407, respectively; and with the port 5 being connected to the switch 4402.

The switch 4402 (i.e., switch β) comprises ports 1 through 6, with the ports 1, 2, 3 and 4 being connected to the PCs 4408, 4409, 4410 and 4411, respectively; and with the ports 5 and 6 being connected to the switches 4401 and 4403, respectively.

The switch 4403 (i.e., switch γ) comprises ports 1 through 5, with the ports 1, 2, 3 and 4 being connected to the PCs 4412, 4413, 4414 and 4415, respectively; and with the port 5 being connected to the switch 4402.

The MAC addresses of the PCs 4404, 4405, 4406, 4407, 4408, 4409, 4410, 4411, 4412, 4413, 4414 and 4415 are A, B, C, D, E, F, G, I, J, K and L, respectively.

Figure 47:
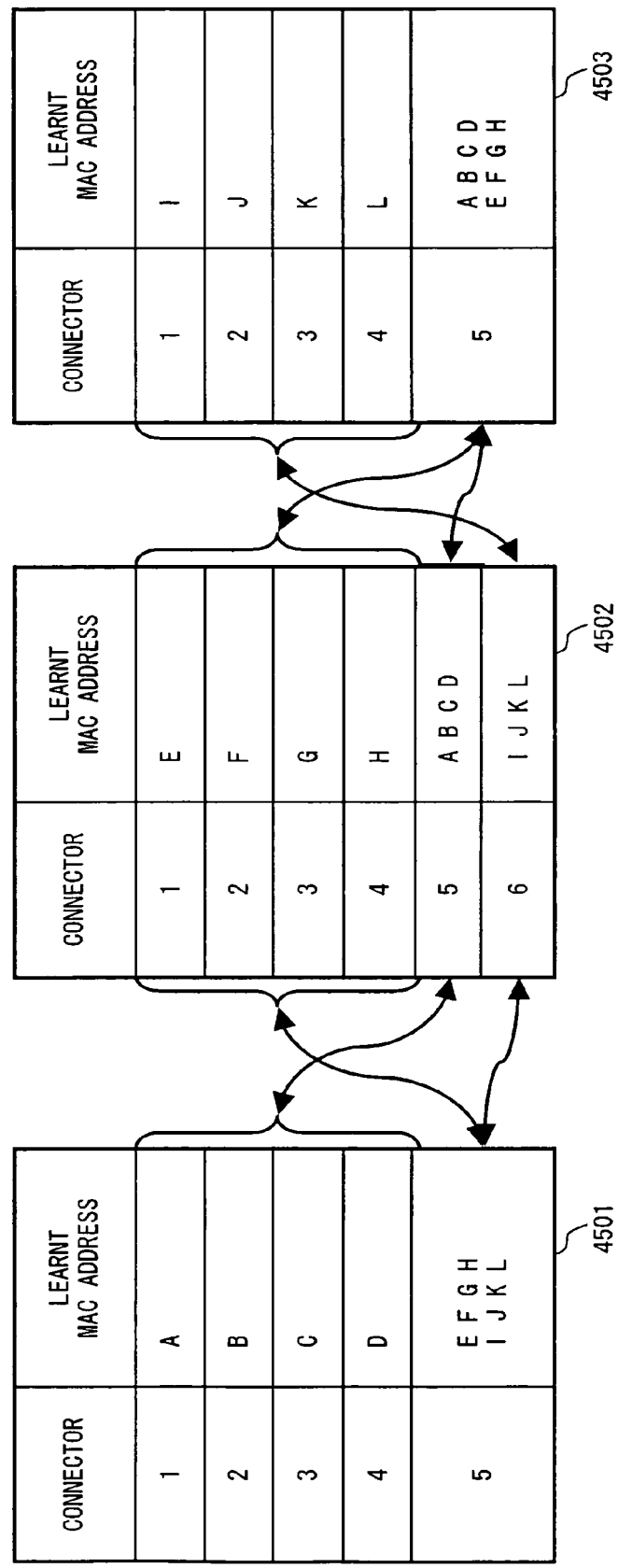
FIG. 47 shows a MAC learning table.

The switches 4401, 4402 and 4403 have the MAC learning tables 4501, 4502 and 4503, respectively, as shown by FIG. 47 for providing a switching service. These MAC learning tables register the MAC addresses learnt for the PCs 4404 through 4415 for respective ports.

As for the port 5 of the switch a for example, the MAC addresses E, F, G and H for the four PCs under the switch β have been learnt; and as for the port 5 of the switch β, the MAC addresses for the four PCs under the switch α have been learnt. This information makes it possible to suppose that the port 5 of the switch α is connected with the port 5 of the switch β. As such, the MAC learning table makes it possible to figure out the connection between switches or the connection between a switch and a PC.

When the device setup information of the switches 4401 through 4403 and the PCs 4404 through 4415 is inputted, the topology construction unit 4213 figures out the link information of physical connection in the procedure as follows.

The topology construction unit 4213 first extracts the MAC learning tables 4501, 4502 and 4503 from the device setup information of the switches to search the physical connections between the switches by referring to these MAC learning tables.

In terms of the adjacent two switches, the learnt MAC addresses for the port of one switch connected to the other switch are equal to the sum of the learnt MAC addresses for ports other than the port of the other switch connected to the one switch.

The topology construction unit 4213 investigates the MAC address tables of all the switches within the network and judges whether or not comparisons of the learnt MAC addresses for each port of the switches by using the logical sums in units of port are successful, in order to figure out the physical connection between the switches.

The topology construction unit 4213 then searches the physical connection between the switches and the respective PCs based on the MAC addresses of the PCs 4404 through 4415 and the search result of the physical connection between switches. Here, the topology construction unit 4213 searches for a port which has the learnt MAC addresses of devices other than the switches in the network (i.e., PCs) among ports, that are not used for the connections between the switches, in the MAC learning table of each switch, and figures out the physical connection between the port and a PC.

Once acquiring the link information of the physical connection, the topology construction unit 4213 uses the link information and node information to perform a topology search process for layer by layer and figure out the topology across a plurality of layers.

In the processing, the topology construction unit 4213 generates an information reaching range on an upper layer by grouping the physical or logical connections contained in the topology of a lower layer among the plurality of layers by using the node information, and generates the topology of the upper layer based on the information reaching range. The topology across the plurality of layers is created by repeating such processing for the physical, MAC, IP, TCP/UDP, and application layers in this order.

(2) Path Search Technology

The present technology is for judging data communication availability between a starting and ending devices (i.e., nodes) on a path as the search target based on the starting node and ending node and topology information as an output result of the topology search technology in order to calculate the data transfer path if the data communication is available. A specific procedure of the path search is as follows.

1. Acquisition of Next Hop on the IP Layer

The IP address of the next hop on the IP layer from the routing information of the starting node for reaching from the starting to ending nodes is acquired.

2. Acquisition of Next Hop on the MAC Layer

The MAC address of the next hop on the MAC layer for reaching the IP address of the next hop is acquired based on the MAC learning table of the starting node. The device becoming the next hop on the MAC layer is determined by referring to the link information obtained by the topology search technology.

3. It is continued to acquire the path information on the MAC layer by repeating the acquisition of the next hop on the MAC layer as described in the above paragraph 2 for the device becoming the next hop in place of the starting node. Once reaching the next hop device on the IP layer after repeating the aforementioned processings, the next hop acquisition on the IP layer as described in the above paragraph 1 is repeated to determine the next hop device to it on the IP layer. The above described processings are repeated until reaching the IP address of the ending node. If the IP address of the ending node can be reached, the judgment is that the data communication is available, whereas if not, then the judgment is that the data communication is not available.

Figure 48:
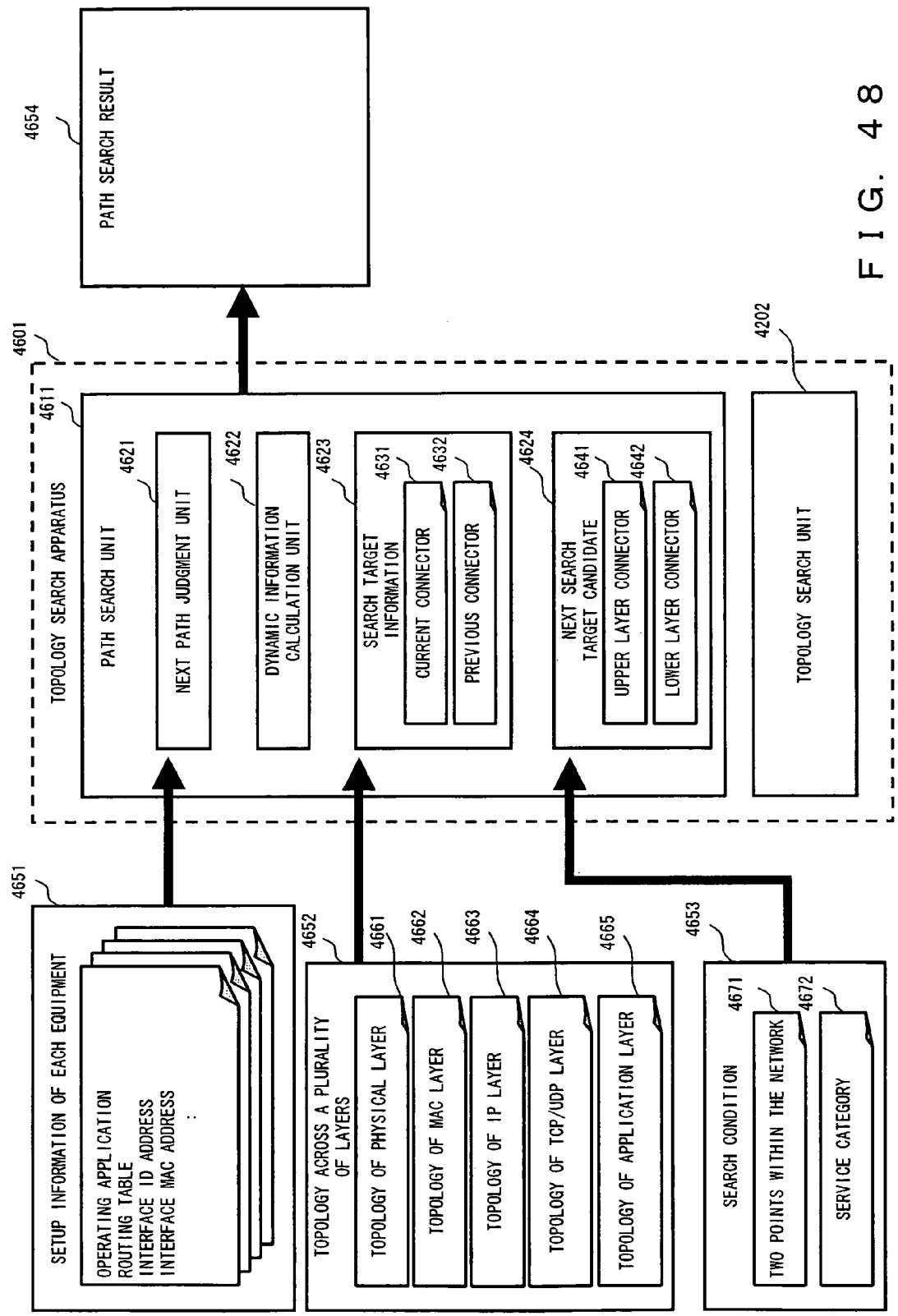
FIG. 48 shows a configuration of a topology search apparatus.

FIG. 48 shows a configuration of topology search apparatus where the path search technology is implemented. The topology search apparatus 4601 shown by FIG. 48 comprises the topology search unit 4202 shown by FIG. 44 and a path search unit 4611. The path search unit 4611 comprises a next path judgment unit 4621 and a dynamic information calculation unit 4622, and retains search target information 4623 and next search target information 4624.

The path search unit 4611 performs a path search process with the setup information 4651 of each device, topology 4652 across a plurality of layers and search condition 4653 as the input information to output a path search result 4654. The setup information 4651 corresponds to the device setup information acquired by the topology information acquisition unit 4212 shown by FIG. 44, and the topology 4652 corresponds to the topology information 4222 shown by FIG. 44.

The topology 4652 includes a physical layer topology 4661, MAC layer topology 4662, IP layer topology 4663, TCP/UDP layer topology 4664 and application layer topology 4665. The search condition 4653 includes the information about the two points 4671 as the starting and ending points within the network, and the one about the service category 4672. The two points 4671 within the network are specified by the node name, IP address, et cetera.

The search target information 4623 contains the information about the current connector 4631 and previous connector 4632, while the next search target candidate 4624 contains the information about an upper layer connector 4641 and lower layer connector 4642. And the path search result 4654 contains the information as shown by FIG. 41. The data structures of the current connector 4631, previous connector 4632, upper layer connector 4641 and lower layer connector 4642 are the same as the connector information shown by FIG. 41.

The next path judgment unit 4621 repeats acquisition of next hops by using the setup information 4651, topology 4652 and search condition 4653 while retaining the information about the current search target in the search target information 4623 and retaining the information about the next search target in the next search target candidate 4624; and outputs a judgment result of data communication possibility and information of the connectors from the starting node to the ending node in the case that the data communication is possible, as a path search result 4654. The dynamic information calculation unit 4622 figures out a destination dynamically if a destination is not obtainable from the next path judgment unit 4621 or there is a need for obtaining the destination by a method such as name resolution.

The fault management apparatus comprises the topology search unit 4202 and path search unit 4611 shown by FIG. 48 in order to utilize the above described "topology search technology" and "path search technology" presented by the prior patent application.

Meanwhile, the fault management apparatus is connected with the network as the management target by way of the network of operations management system in the configuration shown by FIGS. 28 through 30, the fault management apparatus, however, may be directly connected with a node within the network as the management target.

Incidentally, the above described present embodiment assumes the five layers, i.e., physical, MAC, IP, TCP/UDP and application layers, as the hierarchical structure of communication function, the present invention, however, can also be applied to other hierarchical structures, instead of being limited to the above described.

It shall be noted that the fault management apparatus 2701 shown by FIG. 28, fault management apparatus 2801 shown by FIG. 29, fault management apparatus 2901 shown by FIG. 30 and topology search apparatus 4601 shown by FIG. 48 are configured by an information processing apparatus (i.e., computer) as shown by FIG. 49 for example. The information processing apparatus shown by FIG. 49 comprises a CPU 4701, a memory 4702, an input device 4703, an output device 4704, an external storage device 4705, a media drive device 4706 and a network connection device 4704, with a bus 4708 interconnecting the aforementioned components.

The memory 4702, comprehending a ROM (read only memory), and a RAM (random access memory) for example, stores a program and data used for processings. The CPU 4701 performs necessary processings by executing the program by using the memory 4702.

The topology search unit 4202, node detection unit 4211, topology information acquisition unit 4212 and topology construction unit 4213 all shown by FIG. 44; and the path search unit 4611, next path judgment unit 4621 and dynamic information calculation unit 4622 all shown by FIG. 48 all corresponds to the program stored in the memory 4702.

The input device 4703, corresponding to a keyboard, pointing device for example, is used for the user inputting an instruction or information. The output device 4704, corresponding to a display, printer, speaker for example, is used for outputting an inquiry to the user, a processing result, et cetera.

The external storage device 4705 corresponds to a magnetic disk, optical disk, magneto-optical disk, tape devices for example. The information processing apparatus stores the program and data in the external storage device 4705 to use by loading onto the memory 4702 on a required basis.

The media drive device 4706 drives a portable recording medium 4709 to access the recording contents therein. The portable recording medium 4709 corresponds to a computer readable recording media such as a memory card, flexible disk, optical disk, magneto-optical disk, et cetera. The user stores the program and data in the portable recording medium 4709 to use them by loading onto the memory 4702 on a required basis.

The network connection device 4707 is connected with an arbitrary communication network, such as LAN (local area network) or Internet, to perform a data conversion in association with communication. The information processing apparatus receives the program and data from an external apparatus by way of the network connection device 4707 and use them by loading onto the memory 4702 on a required basis.

Figure 50:
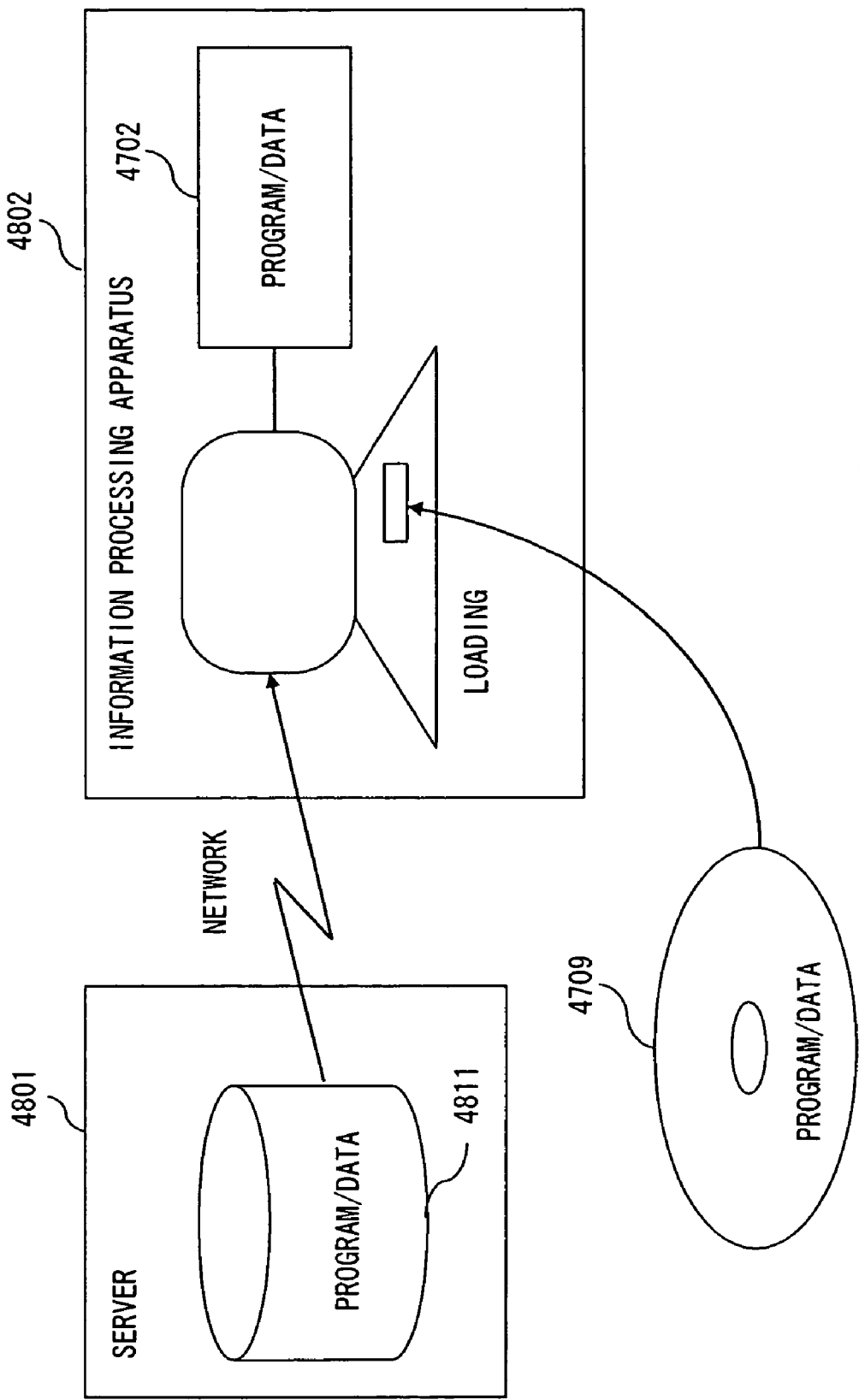
FIG. 50 shows a method for providing a program and data.

FIG. 50 shows a method for providing a program and data to the information processing apparatus shown by FIG. 49. The program and data stored by the portable recording medium 4709, or in a data base 4811 comprised by a server 4801, are loaded onto the memory 4702 comprised by an information processing apparatus 4802. A server 4801 generates a propagation signal for propagating the program and data to transmit to the information processing apparatus 4802 via an arbitrary transmission medium on the network. The CPU 4701 executes the program by using the data to perform a necessary processing.

What is claimed is:
1. An apparatus comprising:
   a generation device which generates communication availability information indicating availability of communication between a plurality of transmitters and a plurality of destinations in a communication network having a communication function in a hierarchical structure of a plurality of layers, the availability of communication being obtained on each layer of the plurality of layers, before and after a communication state between a transmitter and a destination-changes from available to unavailable;

an identification device which identifies a first device and a layer as a cause of fault by repeating, layer by layer starting from a search starting layer toward a lower layer in the hierarchical structure of the plurality of layers, processes of dividing the communication network into a plurality of affected ranges being affected by the fault in each of the plurality of layers, so that a communication is available between any devices within each of the affected ranges in each of the plurality of layers and unavailable between any devices across two of the affected ranges in each of the plurality of layers, by comparing the communication availability information before and after the communication state changes and grouping destinations in paths where the communication state has changed from available to unavailable, and deducing an interface of a second device located at a border between the affected ranges as a fault occurrence point, wherein the plurality of layers include an application layer, a transmission control protocol/user datagram protocol layer, an Internet protocol layer, a media access control layer and a physical layer.

2. A computer-readable non-transitory recording medium storing a program for a computer, wherein the program enables the computer to perform:

generating first communication availability information indicating availability of communication between a plurality of transmitters and a plurality of destinations in a communication network having a communication function in a hierarchical structure of a plurality of layers, the availability of communication being obtained on each layer of the plurality of layers in a normal state;

generating second communication availability information indicating availability of communication between the plurality of transmitters and the plurality of destinations in the communication network on each layer of the plurality of layers after a communication state between a transmitter and a destination changes from available to unavailable;

identifying a first device and a layer as a cause of fault by repeating, layer by layer starting from a search starting layer toward a lower layer in the hierarchical structure of the plurality of layers, processes of dividing the communication network into a plurality of affected ranges being affected by the fault in each of the plurality of layers, so that a communication is available between any devices within each of the affected ranges in each of the plurality of layers and unavailable between any devices across two of the affected ranges in each of the plurality of layers, by comparing the first communication availability information and the second communication availability information and grouping destinations in paths where the communication state has changed from available to unavailable, and deducing an interface of a second device located at a border between the affected ranges as a fault occurrence point, wherein the plurality of layers include an application layer, a transmission control protocol/user datagram protocol layer, an Internet protocol layer, a media access control layer and a physical layer.

3. The recording medium according to claim 2, wherein said program enables said computer further to detect a change in the communication state by monitoring a result of trying a communication between the transmitter and the destination.

4. The recording medium according to claim 2, wherein said program enables said computer further to detect a change in the communication state by judging whether or not data communication is possible between the transmitter and the destination.

5. The recording medium according to claim 2, wherein said program enables said computer to perform acquiring interface information for each layer from a plurality of devices constituting said communication network before and after the communication state changes, generating a topology of each layer based on the interface information, and generating the first communication availability information and the second communication availability information for each layer by using the generated topology.

6. The recording medium according to claim 5, wherein said program enables said computer to generate the topology of each layer by repeating processes of grouping connections included in a topology of a lower layer among the plurality of layers by using said interface information, generating an information reachable range on an upper layer, and generating a topology of the upper layer from the information reachable range.

7. The recording medium according to claim 5, wherein said program enables said computer to generate the first communication availability information and the second communication availability information for each layer by judging whether or not data communication is possible between said plurality of transmitters and said plurality of destinations by using the generated topology.

8. The recording medium according to claim 2, wherein said program enables said computer to perform selecting a device in which a client process of a specified application service is activated as a transmitter on the application layer, selecting a device in which a server process of the application service is activated as a destination on the application layer, and generating the first communication availability information and the second communication availability information for the application layer.

9. The recording medium according to claim 2, wherein said program enables said computer to perform selecting a device in which a port for a specified application service is activated as a destination on the transmission control protocol/user datagram protocol layer, and generating the first communication availability information and the second communication availability information for the transmission control protocol/user datagram protocol layer.

10. The recording medium according to claim 2, wherein said program enables said computer to perform selecting a device which has an Internet protocol address as another transmitter and another destination on the Internet protocol layer, and generating the first communication availability information and the second communication availability information for the Internet protocol layer.

11. The recording medium according to claim 2, wherein said program enables said computer to perform selecting a device which has a media access control address as a transmitter and a destination on the media access control layer, and generating the first communication availability information and the second communication availability information for the media access control layer.

12. The recording medium according to claim 2, wherein said program enables said computer to display on a screen, information about said plurality of affected ranges and fault occurrence point in relation with said plurality of layers.

13. The recording medium according to claim 2, wherein said program enables said computer further to perform monitoring a result of trying a communication between the transmitter and the destination to detect a change in the communication state.

14. The recording medium according to claim 2, wherein said program enables said computer further to perform inputting monitor information specifying the transmitter and the destination as a monitoring target.

15. The recording medium according to claim 2, wherein said program enables said computer further to perform storing, in a storage device, the generated communication availability information in a normal state.

16. The recording medium according to claim 2, wherein said program enables said computer further to perform storing, in a storage device, the generated communication availability information after the communication state changes from available to unavailable.

17. The recording medium according to claim 2, wherein said program enables said computer further to perform outputting information about the plurality of affected ranges and the fault occurrence point.

18. The recording medium according to claim 2, wherein said program enables said computer to perform:

selecting a device which has a port as a transmitter and a destination on the physical layer, and generating the first communication availability information and the second communication availability information for the physical layer.

19. A method comprising:

generating first communication availability information indicating availability of communication between a plurality of transmitters and a plurality of destinations in a communication network having a communication function in a hierarchical structure of a plurality of layers, the availability of communication being obtained on each layer of the plurality of layers in a normal state;

generating second communication availability information indicating availability of communication between the plurality of transmitters and the plurality of destinations in the communication network on each layer of the plurality of layers after a communication state between a transmitter and a destination changes from available to unavailable;

identifying a first device and a layer as a cause of fault by repeating, layer by layer starting from a search starting layer toward a lower layer in the hierarchical structure of the plurality of layers, processes of dividing the communication network into a plurality of affected ranges being affected by the fault in each of the plurality of layers, so that a communication is available between any devices within each of the affected ranges in each of the plurality of layers and unavailable between any devices across two of the affected ranges in each of the plurality of layers, by comparing the first communication availability information and the second communication availability information and grouping destinations in paths where the communication state has changed from available to unavailable, and deducing an interface of a second device located at a border between the affected ranges as a fault occurrence point, wherein the plurality of layers include an application layer, a transmission control protocol/user datagram protocol layer, an Internet protocol layer, a media access control layer and a physical layer.

* * * * *